United States Patent
Niwa et al.

(10) Patent No.: US 9,118,270 B2
(45) Date of Patent: Aug. 25, 2015

(54) MOTOR CONTROL DEVICE INCLUDING ELECTRIC STORAGE DEVICE AND RESISTANCE DISCHARGE DEVICE

(71) Applicant: FANUC CORPORATION, Yamanashi (JP)

(72) Inventors: Masakazu Niwa, Yamanashi (JP); Kenta Yamamoto, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 32 days.

(21) Appl. No.: 14/165,849

(22) Filed: Jan. 28, 2014

(65) Prior Publication Data
US 2014/0210389 A1 Jul. 31, 2014

(30) Foreign Application Priority Data
Jan. 29, 2013 (JP) .................................. 2013-014552

(51) Int. Cl.
*H02P 3/12* (2006.01)
*H02P 3/14* (2006.01)
(Continued)

(52) U.S. Cl.
CPC .. *H02P 3/14* (2013.01); *H02P 3/12* (2013.01); *H02P 3/22* (2013.01); *H02P 5/74* (2013.01)

(58) Field of Classification Search
CPC .......... B66B 1/30; B66B 1/285; B66B 1/302; B66B 1/308; Y02B 50/142; H02J 7/34; H02J 1/108; H02J 7/0047; H02J 7/0072; H02J 7/0075; H02J 9/061; H02J 9/062; H02P 23/06; H02P 2201/09; H02P 27/00
USPC ...................... 318/400.03, 139, 801; 187/290
See application file for complete search history.

(56) References Cited

U.S. PATENT DOCUMENTS 6,353,545 B1 * 3/2002 Ueda ................................ 363/40
6,422,351 B2 * 7/2002 Tajima et al. .................. 187/290
(Continued)

FOREIGN PATENT DOCUMENTS

CN 1574604 A 2/2005
CN 102001557 A 4/2011
(Continued)

OTHER PUBLICATIONS

English Translation of Abstract for Chinese Publication No. 102001557 published Apr. 6, 2011, 1 page.
(Continued)

*Primary Examiner* — Paul Ip
(74) *Attorney, Agent, or Firm* — Fredrikson & Byron, P.A.

(57) ABSTRACT

A motor control device includes a rectifier, an inverter connected to the rectifier via the DC link, a power failure detecting unit detecting power failure, a voltage detecting unit detecting a DC voltage at the DC link, an electric storage unit storing DC power, a charging unit that can make charging by boosting to a voltage higher than the DC voltage, a discharging unit discharging DC power, a resistance discharge device that performs resistance discharging of DC power at the DC link when the DC voltage after power failure is equal to or higher than a predetermined start level and that does not perform resistance discharging when the DC voltage is equal to or lower than a predetermined stop level, and a discharging operation determining unit operating the discharging unit when the DC voltage at the DC link after power failure is equal to or lower than a predetermined threshold.

5 Claims, 17 Drawing Sheets

(51) Int. Cl.
*H02P 3/22* (2006.01)
*H02P 5/74* (2006.01)

(56) References Cited

U.S. PATENT DOCUMENTS

| | | | |
|---|---|---|---|
| 6,435,312 B2* | 8/2002 | Tajima et al. | 187/290 |
| 6,457,565 B2* | 10/2002 | Tominaga et al. | 187/290 |
| 6,522,099 B2* | 2/2003 | Tominaga et al. | 318/801 |
| 6,533,074 B2* | 3/2003 | Tominaga et al. | 187/290 |
| 6,732,838 B1* | 5/2004 | Okada et al. | 187/290 |
| 8,590,672 B2* | 11/2013 | Oggianu et al. | 187/290 |
| 8,887,872 B2* | 11/2014 | Chen et al. | 187/290 |
| 2001/0017237 A1* | 8/2001 | Tominaga et al. | 187/290 |
| 2001/0017239 A1* | 8/2001 | Tajima et al. | 187/290 |
| 2001/0017242 A1* | 8/2001 | Tajima et al. | 187/296 |
| 2002/0179376 A1* | 12/2002 | Tominaga et al. | 187/290 |
| 2002/0189906 A1* | 12/2002 | Tominaga et al. | 187/290 |
| 2009/0015201 A1* | 1/2009 | Fukumura et al. | 320/130 |
| 2010/0214055 A1* | 8/2010 | Fuji et al. | 340/3.1 |
| 2011/0147130 A1* | 6/2011 | Oggianu et al. | 187/290 |
| 2011/0226559 A1* | 9/2011 | Chen et al. | 187/290 |
| 2014/0021888 A1* | 1/2014 | Niwa et al. | 318/139 |

FOREIGN PATENT DOCUMENTS

| | | |
|---|---|---|
| JP | 11178245 A | 7/1999 |
| JP | 2002338151 A | 11/2002 |
| JP | 20050192298 A | 7/2005 |
| JP | 2005263408 A | 9/2005 |
| JP | 2009261161 A | 11/2009 |

OTHER PUBLICATIONS

English Translation of Abstract for Chinese Publication No. 1574604 published Feb. 2, 2005, 1 page.

* cited by examiner

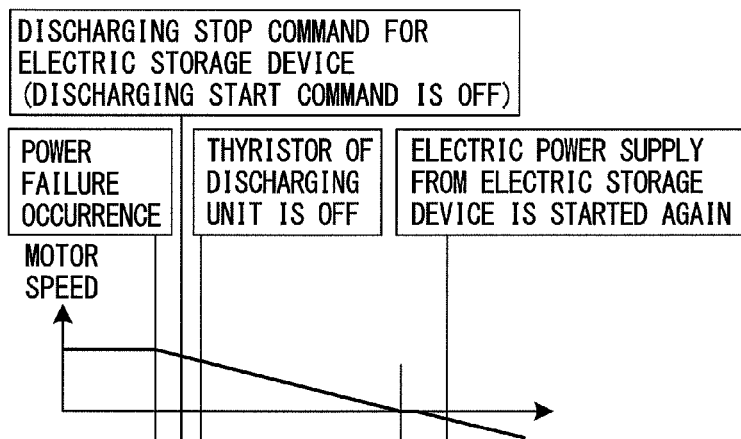
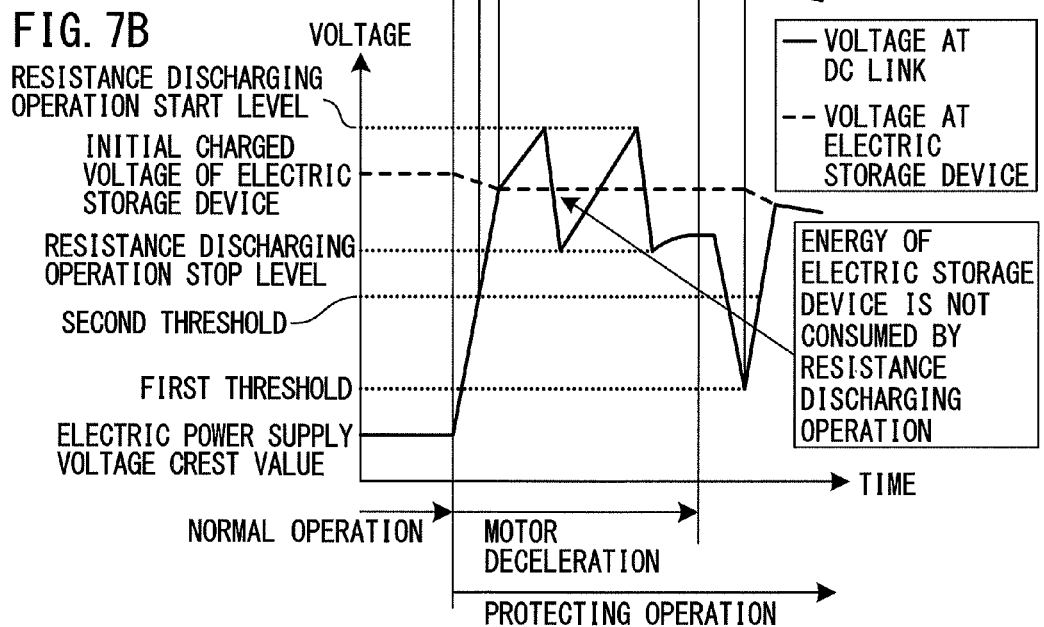

DRIVING COMMAND OR OUTPUT INFORMATION FOR MOTOR

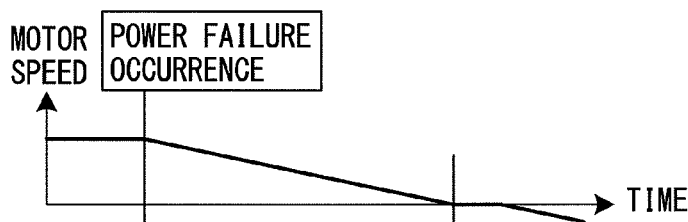
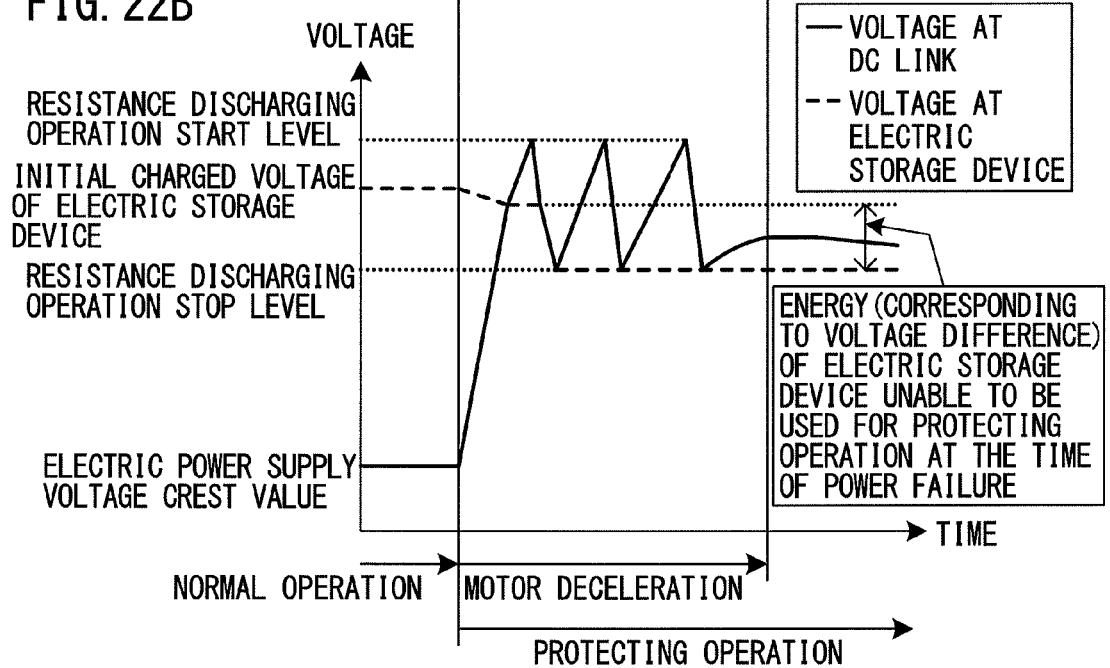

MOTOR CONTROL DEVICE INCLUDING ELECTRIC STORAGE DEVICE AND RESISTANCE DISCHARGE DEVICE

BACKGROUND OF THE INVENTION

1. Field of the Invention

The present invention relates to a motor control device that converts alternating current (AC) power supplied from an AC side into direct current (DC) power to output the DC power, and then, further inverts the DC power into AC power for driving a motor to supply the AC power to the motor. In particular, the present invention relates to the motor control device that includes an electric storage device storing energy for protecting operation at the time of power failure, and a resistance discharge device consuming DC power of a DC link by resistance discharge.

2. Description of the Related Art

In a motor control device that drives a motor in a machine tool, a forging-heading machine, an injection molding machine, an industrial machine, or each of various robots, AC power input from an AC power supply side is converted into DC power once, and is then further inverted into AC power. This AC power is used as drive power for the motor that is provided for each drive axis. The motor control device includes a rectifier and an inverter. The rectifier rectifies the AC power supplied from the AC power supply side at which a three-phase AC input power supply exists, to output DC power. The inverter is connected to a DC link on a DC side of the rectifier. The inverter performs interconversion of electric power between DC power of the DC link and drive power for the motor or regenerative electric power, which are AC power. The motor control device controls a speed or torque of the motor, or a position of a rotor of the motor, the motor being connected to an AC side of the inverter.

Recently, due to demand for saving energy, in many cases, a motor control device is provided with a rectifier by an electric power supply regeneration method that can return, to the AC power supply side, regenerative energy generated at the time of motor deceleration.

FIG. 16 illustrates a configuration of a general motor control device that drives a plurality of motors. The motor control device 101 includes a rectifier 11 and an inverter 12. The rectifier 11 rectifies AC power from a commercial three-phase AC input power supply 3 to output DC power. The inverter 12 is connected to a DC link 13 on a DC side of the rectifier 11. The inverter 12 inverts the DC power output from the rectifier 11 into AC power of a desired voltage and a desired frequency that is supplied as drive power for a motor 2, or converts AC power regenerated from the motor 2 into DC power. The motor control device 101 controls a speed or torque of the motor 2, or a position of a rotor of the motor 2, the motor 2 being connected to an AC side of the inverter 12. The same number of the inverters 12 as the number of the motors 2 are provided for individually supplying drive power to each of the motors 2 respectively provided in correspondence with a plurality of drive axes, to drive and control the motors 2. However, in many cases, one rectifier 11 is provided for a plurality of the inverters 12 in order to reduce cost and an occupied space of the motor control device 101.

An higher-level control device (not illustrated) transmits a motor drive command to each inverter 12 to control operation of inverting DC power into AC power by each inverter 12 (more concretely, switching operation of switching devices in each inverter 12). Thereby, the higher-level control device performs control such that each inverter 12 inverts DC power at the DC link 13 to output desired AC power. The motor 2 operates with drive power which is the AC power output from the inverter 12. Accordingly, controlling AC power output from the inverter 12 can control a speed or torque of the motor 2, or a position of the rotor of the motor 2, the motor 2 being connected to the AC side of the inverter 12. When the motor control device 101 controls the motor to be decelerated, regenerative electric power is generated from the motor 2. This regenerative electric power passes through the inverter 12 to be converted into DC power, returned to the DC link 13, and further inverted into AC power by the rectifier 11. Then, the AC power is returned to an AC power supply side where a three-phase AC input power supply 3 exists.

In such a motor control device 101, when power failure occurs on the AC power supply side of the rectifier 11 and an input power supply voltage declines, normal operation of the motor 2 is difficult to be continued. For this reason, some inconvenience occur. For example, the motor 2, the motor control device 101 driving the motor 2, a tool connected to the motor 2 driven by the motor control device 101, a machining target machined by the tool, a manufacturing line including the motor control device 101, and the like are damaged or deformed. Accordingly, a power failure detecting unit 14 is provided on the AC power supply side of the rectifier 11 to monitor whether or not power failure occurs on the AC power supply side of the rectifier 11. When the power failure detecting unit 14 detects power failure occurrence, the motor control device 101 operates so as to perform protecting operation for avoiding the above-mentioned inconvenience or suppressing the inconvenience to the minimum. As a device that stores energy used for performing the protecting operation at the time of power failure, an electric storage device 17 is connected, via a charging unit 15 and a discharging device 16, to the DC link 13 between the rectifier 11 and the inverter 12. A charging-and-discharging control unit 118 outputs, to the charging unit 15, a charging command that causes the electric storage device 17 to store DC power. The charging-and-discharging control unit 118 outputs, to a discharging unit 16, a discharging start command that causes the DC power stored in the electric storage device 17 to be discharged to the DC link 13.

By the operation of the discharging unit 16, the DC electric power stored in the electric storage device 17 is supplied to the DC link 13. For example, when power failure occurs on the AC power supply side of the rectifier 11, or when the three-phase AC input power supply 3 existing on the AC power supply side is an electric generator, regenerative energy is difficult to be returned to the AC power supply side where the three-phase AC input power supply 3 exists, and there is a possibility that a DC voltage at the DC link 13 rises to a voltage beyond withstanding voltages of the rectifier 11, the switching devices in the inverter 12, and the like. By taking it into account, to deal with such a situation, a resistance discharge device 19 is provided at the DC link 13 between the rectifier 11 and the inverter 12. Thereby, a measure to consume DC power supplied from the electric storage device 17, and regenerative electric power generated at the time of motor deceleration, as heat energy of a resistance (also referred to as "regenerative resistance") in the resistance discharge device 19.

In the motor control device 101 including the above-described configuration, before the motor 2 is driven, the charging-and-discharging control unit 118 outputs a charging command to the charging unit 15, and DC power at the DC link 13 is stored in the electric storage device 17. After a charged voltage of the electric storage device 17 reaches a desired DC voltage, the motor control device 101 starts to drive and control the motor 2. Since a charged voltage of the electric storage device 17 declines due to natural discharge and the like, the electric storage device 17 is continuously charged by the charging unit 15 also during a period in which the motor 2 is being driven. In other words, when a charged voltage of the electric storage device 17 becomes equal to or lower than a predetermined voltage, the charging-and-discharging control unit 118 outputs a charging command to the charging unit 15 so that the electric storage device 17 is charged.

When the power failure detecting unit 14 detects power failure occurrence, the charging-and-discharging control unit 118 stops output of a charging command to the charging unit 15, and outputs a discharging start command to the discharging unit 16. Thereby, charging of the electric storage device 17 by the charging unit 15 is stopped, and DC power stored in the electric storage device 17 is discharged to the DC link 13 via the discharging unit 16. The higher-level control device (not illustrated) outputs, to each inverter 12, a motor driving command for performing protecting operation for avoiding the inconvenience or suppressing the inconvenience to the minimum, the inconvenience being breakage or the like of the motor 2, the motor control device 101 driving the motor 2, a tool connected to the motor 2 driven by the motor control device 101, a machining target machined by the tool, a manufacturing line including the motor control device 101, and the like. On the basis of the motor driving command for the protecting operation, the inverter 12 performs switching operation of the switching devices in the inverter 12 to invert DC power at the DC link 13 into AC power that just enables the motor 2 to perform the protecting operation, and the inverter 12 outputs the inverted AC power. By the operation of the discharging unit 16, DC power stored in the electric storage device 17 is supplied to the DC link 13. However, it is possible for a DC voltage at the DC link 13 to exceed withstanding voltages of the rectifier 11, the switching devices in the inverter 12, and the like, and to rise to a voltage that allows each device to be broken. To avoid this, at the time of the protecting operation, when a DC voltage at the DC link 13 reaches a specified voltage or more, the resistance discharge device 19 converts DC power at the DC link 13 into heat energy to consume the DC power.

One example of the charging unit 15, the discharging unit 16, and the resistance discharge device 19 will be described as follows.

For example, a motor control device according to Japanese Unexamined Patent Publication No. 2012-158483 includes an electric storage device at a DC link between a rectifier and an inverter, and boosts a voltage at the DC link to store, in the electric storage device, energy for protecting operation at the time of power failure. Thereby, storage energy at a unit volume is maximized to reduce a volume and cost of the electric storage device.

FIG. 17 is a circuit diagram illustrating one concrete example of the charging unit in the motor control device according to Japanese Unexamined Patent Publication No. 2012-158483. In the motor control device according to Japanese Unexamined Patent Publication No. 2012-158483, the charging unit 15 with a boosting function of charging the electric storage device (not illustrated) at a voltage higher than a DC voltage at the DC link (not illustrated) is configured by a buck-boost chopper circuit including switches S1 and S2, diodes D1 and D2, and an inductor L1. When the electric storage device is charged, on the basis of comparison between a charged voltage of the electric storage device and a DC voltage at the DC link, on-off control is performed on the switches S1 and S2. When a charged voltage of the electric storage device is smaller than a DC voltage at the DC link, the switch S2 is kept normally off, and on-off control is performed on the switch S1 at a predetermined duty ratio to charge the electric storage device. Then, when a charged voltage of the electric storage device becomes larger than a DC voltage at the DC link, the switch S1 is kept normally on, and on-off control is performed on the switch S2 at a predetermined duty ratio to charge the electric storage device. By such a charging unit 15, the electric storage device is able to be charged such that a voltage of the electric storage device is boosted to a voltage higher than a DC voltage at the DC link 13. For example, when the electric storage device is a capacitor, energy P[J] stored in this electric storage device is proportional to the square of a charged voltage V as expressed by the Expression 1, the charged voltage of the electric storage device being V[V], a capacitor capacitance being C[F].

$$P = \tfrac{1}{2}CV^2 \tag{1}$$

In the invention according to Japanese Unexamined Patent Publication No. 2012-158483, a voltage of the electric storage device is boosted close to a withstanding voltage of each device of the rectifier and the inverter connected to the DC link, thereby, stored energy in a unit volume can be maximized. Accordingly, it is possible to miniaturize the electric storage, and reduce cost.

FIG. 18 is a circuit diagram schematically illustrating the discharging unit according to the invention described in Japanese Unexamined Patent Publication No. 11-178245. According to the invention described in Japanese Unexamined Patent Publication No. 11-178245, the discharging unit 16 is configured by a thyristor S3 and an inductor L2. When power failure occurs at an AC power supply side of a rectifier (not illustrated), the thyristor S3 is turned on to make short-circuiting between a DC link (not illustrated) and an electric storage device (not illustrated) to supply DC power stored in the electric storage device to the DC link.

FIG. 19 is a circuit diagram illustrating one concrete example of the resistance discharge device in the motor control device according to Japanese Unexamined Patent Publication No. 2012-158483. FIG. 20 illustrates one example of fluctuation in a DC voltage at the DC link at the time of power failure operation in the one concrete example of the resistance discharge device in the motor control device according to Japanese Unexamined Patent Publication No. 2012-158483. As illustrated in FIG. 19, the resistance discharge device 19 includes a resistance R1, and a switch S4 that makes opening or closing between this resistance R1 and the DC link (not illustrated). After power failure occurrence at the AC power supply side of the rectifier (not illustrated) is detected, when a DC voltage at the DC link exceeds a resistance discharging operation start level set in advance, the switch S4 is closed. Thereby, regenerative energy from the inverter (not illustrated) to the DC link is consumed at the resistance R1 as heat energy so that a DC voltage at the DC link drops. Then, when a DC voltage at the DC link declines to a resistance discharging operation stop level set in advance, the switch S4 is opened. Thereby, owing to regenerative energy from the inverter to the DC link, a DC voltage at the DC link is shifted to rising. Thus, start and stop of the resistance discharging operation of the resistance discharge device 19 causes a DC voltage at the DC link to repeatedly rise and decline between the resistance discharging operation stop level and the resistance discharging operation start level. Generally, as illustrated in FIG. 20, hysteresis is given between the resistance discharging operation start level and the resistance discharging operation stop level such that switching between start and stop of the resistance discharging operation of the resistance discharge device 19 does not occur too often.

For example, as described in Japanese Unexamined Patent Publication No. 2002-338151, an elevator device is proposed. In the elevator device, an electric storage device is connected, via a charging-and-discharging device, to a smoothing capacitor provided between a rectifying unit and an inverter. At the time of regenerative operation, the electric storage device is charged by dropping voltage of the smoothing capacitor. At the time of power running, and at the time of power failure, a voltage of the electric storage device is boosted and discharged to the smoothing capacitor. Accordingly, it is possible to use regenerative energy effectively, without increasing a capacitance of the electric storage device.

Further, for example, as described in Japanese Unexamined Patent Publication No. 2005-192298, an elevator device is proposed. In the elevator device, a rechargeable battery is connected, via a DC-DC converter, to a smoothing capacitor between a converter and an inverter. The rechargeable battery is charged by an initial charging current that is determined by an estimation value of an inverter consuming electric power at the time of power failure, and a voltage of the rechargeable battery. Only at the time of power failure, electric power is supplied from the rechargeable battery. Thereby, at the time of power failure, the rechargeable battery is in a fully charged state so that long time operation can be performed with certainty.

Furthermore, for example, as described in Japanese Unexamined Patent Publication No. 2009-261161, there is a method in which a capacitor is provided between a converter unit and an inverter unit, and at the time of detecting voltage drop at a DC side of a rectifier caused by decline in an AC voltage at an AC side of the rectifier, energy stored in the capacitor is used to continue operation of a motor.

However, in a case in which an electric storage device is boosted and charged by using a charging unit with a boosting function of charging an electric storage device at a voltage higher than a DC voltage at a DC link, there is a possibility that when DC power is started to be supplied from the electric storage device to the DC link immediately after power failure occurs at the AC power supply side of the rectifier, energy for the protection operation at the time of power failure is consumed by the resistance discharge device, and therefore, intended protecting operation is difficult to be performed.

FIG. 21 illustrates voltage fluctuation in the DC link and voltage fluctuation in the electric storage device when power failure occurs under motor stop, and DC power is supplied from the electric storage device to the DC link, in a situation where the electric storage device is boosted and charged by using the charging unit with the boosting function. When power failure occurs at the AC power supply side of the rectifier under motor stop, and DC power is started to be supplied from the electric storage device to the DC link, a DC voltage at the DC link rises to a voltage close to an initial charged voltage of the electric storage device since capacitor capacitance of the electric storage device is generally larger than the sum of capacitor capacitance of the rectifier and the inverter. At the time of power failure, electric power for driving motor is difficult to be supplied from the AC power supply side, and accordingly, the protecting operation is performed by energy stored in the electric storage device and the DC link.

However, when power failure occurs at the AC power supply side of the rectifier under motor rotation, energy of the electric storage device is difficult to be used effectively. FIG. 22A and FIG. 22B illustrate voltage fluctuation in the DC link and voltage fluctuation in the electric storage device when power failure occurs under motor rotation, and DC power is supplied from the electric storage device to the DC link, in a situation where the electric storage device is boosted and charged by using the charging unit with the boosting function. FIG. 22A illustrates a motor speed, and FIG. 22B illustrates voltages at the DC link and the electric storage device. A resistance discharging operation start level of the resistance discharge device is set at a level that protects each device of the rectifier and the inverter connected to the DC link. Meanwhile, the electric storage device is boosted and charged almost to a withstand voltage of each device of the rectifier and the inverter connected to the DC link, by the charging unit. Accordingly, the resistance discharging operation start level of the resistance discharge device is set at a voltage that is almost equal to or larger than a voltage at which the electric storage device is charged by boosting, as illustrated in FIG. 22B. When power failure occurs under motor rotation, the protecting operation is started, and the motor is decelerated. Further, at the same time as the motor deceleration, DC power is started to be supplied from the electric storage device to the DC link. In addition, regenerative electric power from the motor is also returned to the DC link. For this reason, a DC voltage at the DC link exceeds the initial charged voltage of the electric storage device. Then, when a DC voltage at the DC link reaches the resistance discharging operation start level set in advance, the resistance discharge device starts the resistance discharging operation. Thereby, DC power of the electric storage device and the DC link is consumed as heat energy, and a DC voltage at the DC link is shifted to dropping. When the resistance discharging operation is started once, the resistance discharging operation is performed until voltages at the DC link and the electric storage device decline to the resistance discharging operation stop level. After that, in a period in which the motor is decelerated, a DC voltage at the DC link repeatedly rises and declines between the resistance discharging operation stop level and the resistance discharging operation start level. In the period in which the motor is decelerated, a voltage of the electric storage device does not rise, and is maintained at the resistance discharging operation stop level.

Thus, when DC power is started to be supplied from the electric storage device to the DC link immediately after power failure occurrence, a DC voltage at the DC link rises, and when a DC voltage at the DC link reaches the resistance discharging operation start level, the resistance discharging operation of the resistance discharge device is started so that a DC voltage at the DC link declines. The decline of a DC voltage at the DC link continues until a DC voltage at the DC link reaches the resistance discharging operation stop level. The resistance discharging operation stop level is lower than the initial charged voltage of the electric storage device. Accordingly, energy almost corresponding to a voltage from the initial charged voltage of the electric storage device to the resistance discharging operation stop level is wastefully consumed by the resistance discharge device. In other words, a part of energy of the electric storage device stored for the protecting operation is wastefully consumed as heat energy by the resistance discharge device. For this reason, energy efficiency is low. There is a possibility that energy needed for the protecting operation is insufficient, depending on a consumption situation of DC power discharged from the electric storage device, the consumption being performed by the resistance discharge device. When an energy storage capacitance of the electric storage device is designed to have a margin such that energy needed for the protecting operation does not become insufficient, a volume and cost of the electric storage device is increased.

SUMMARY OF THE INVENTION

In view of the above-described problems, an object of the present invention is to provide a motor control device that can efficiently use energy stored in an electric storage device as energy for protecting operation at the time of power failure.

In order to accomplish the above-described object, according to a first aspect, a motor control device includes: a rectifier that rectifies AC power supplied from an AC power supply side to output DC power; an inverter that is connected to a DC link at a DC side of the rectifier, and performs interconversion of electric power between DC power of the DC link and drive power for a motor or regenerative electric power, which are AC power; a power failure detecting unit that detects power failure at the AC power supply side of the rectifier; a voltage detecting unit that detects a DC voltage value at the DC link; an electric storage device that is connected to the DC link, and stores DC power; a charging unit that has a boosting function of charging the electric storage device at a voltage higher than a DC voltage at the DC link; a discharging unit that makes short-circuiting between the electric storage device and the DC link to discharge DC power stored in the electric storage device to the DC link; a resistance discharge device that is connected to the DC link wherein after the power failure detecting unit detects power failure, the resistance discharge device starts resistance discharging operation of consuming DC power of the DC link by resistance discharging, when a DC voltage value detected by the voltage detecting unit is equal to or higher than a resistance discharging start level, and the resistance discharge device stops the resistance discharging operation when a DC voltage value detected by the voltage detecting unit is equal to or lower than a resistance discharging stop level lower than the resistance discharging start level; and a discharging operation determining unit that does not output a discharging start command for operating the discharging unit during a period from the time after the power failure detecting unit detects power failure to the time that a DC voltage value detected by the voltage detecting unit becomes equal to or lower than a first threshold, and that outputs the discharging start command for operating the discharging unit when a DC voltage value detected by the voltage detecting unit becomes equal to or lower than the first threshold.

In the first aspect, the first threshold may be set to be equal to or lower than a crest value of an input voltage at the AC side of the rectifier.

After the power failure detecting unit detects a power failure, the discharging operation determining unit may output a discharging stop command for stopping operation of the discharging unit when a DC voltage value detected by the voltage detecting unit is larger than the second threshold, which is a value equal to or higher than a first threshold and also equal to or lower than the resistance discharging operation stop level.

The motor control device may include a threshold setting unit that sets the first threshold in accordance with a motor driving command commanding operation of the motor, or motor output information that is information on the output of the motor operating based on the motor driving command.

The first threshold may be set to be equal to or lower than a crest value of an input voltage on the AC side of the rectifier, when the motor driving command or the motor output information indicates a regenerating state in which the motor regenerates electric power, and the first threshold may be set in accordance with magnitude of acceleration indicated by the motor driving command or magnitude of output of the motor indicated by the motor output information and also to be a value lower than the resistance discharging stop level when the motor driving command or the motor output information indicates a power running state in which the motor consumes electric power.

According to a second aspect, a motor control device includes: a rectifier that rectifies AC power supplied from an AC power supply side to output DC power; an inverter that is connected to a DC link at a DC side of the rectifier, and performs interconversion of electric power between DC power of the DC link and drive power for a motor or regenerative electric power, which are AC power; a power failure detecting unit that detects power failure at the AC power supply side of the rectifier; a voltage detecting unit that detects a DC voltage value at the DC link; an electric storage device that is connected to the DC link, and stores DC power; a charging unit that has a boosting function of charging the electric storage device at a voltage higher than a DC voltage at the DC link; a discharging unit that makes short-circuiting between the electric storage device and the DC link to discharge DC power stored in the electric storage device to the DC link; a resistance discharge device that is connected to the DC link wherein after the power failure detecting unit detects power failure, the resistance discharge device starts resistance discharging operation of consuming DC power of the DC link by resistance discharging when a DC voltage value detected by the voltage detecting unit is equal to or higher than a resistance discharging start level, and the resistance discharge device stops the resistance discharging operation when a DC voltage value detected by the voltage detecting unit is equal to or lower than a resistance discharging stop level lower than the resistance discharging start level; and a discharging operation determining unit that does not output a discharging start command during a period from the time after the power failure detecting unit detects power failure to the time that a motor driving command commanding power running operation of the motor or motor output information that is information on the output of the motor performing power running operation based on the motor driving command, becomes equal to or higher than a third threshold, and that outputs the discharging start command for operating discharging unit when the motor driving command or the motor output information becomes equal to or higher than the third threshold.

In the second aspect, after the power failure detecting unit detects power failure, the discharging operation determining unit may output a discharging stop command for stopping operation of the discharging unit when a motor driving command commanding regenerating operation of the motor or motor output information that is information on the output of the motor performing regenerating operation based on the motor driving command, is equal to or lower than a fourth threshold lower than the third threshold.

BRIEF DESCRIPTION OF THE DRAWINGS

The present invention is understood more clearly by referring to the following attached drawings, in which:

FIG. 7A illustrates voltage fluctuation of the DC link and the electric storage device in the motor control device according to the second embodied example when power failure occurs under motor rotation, and DC power is supplied from the electric storage device to the DC link, and illustrates a motor speed;

FIG. 7B illustrates voltage fluctuation of the DC link and the electric storage device in the motor control device according to the second embodied example when power failure occurs under motor rotation, and DC power is supplied from the electric storage device to the DC link, and illustrates voltages at the DC link and the electric storage device;

FIG. 22A illustrates voltage fluctuation in the DC link and voltage fluctuation in the electric storage device when power failure occurs under motor rotation, and DC power is supplied from the electric storage device to the DC link, in a situation where the electric storage device is boosted and charged by using the charging unit with the boosting function, and illustrates a motor speed; and FIG. 22B illustrates voltage fluctuation in the DC link and voltage fluctuation in the electric storage device when power failure occurs under motor rotation, and DC power is supplied from the electric storage device to the DC link, in a situation where the electric storage device is boosted and charged by using the charging unit with the boosting function, and illustrates voltages at the DC link and the electric storage device.

DETAILED DESCRIPTION

Figure 1:
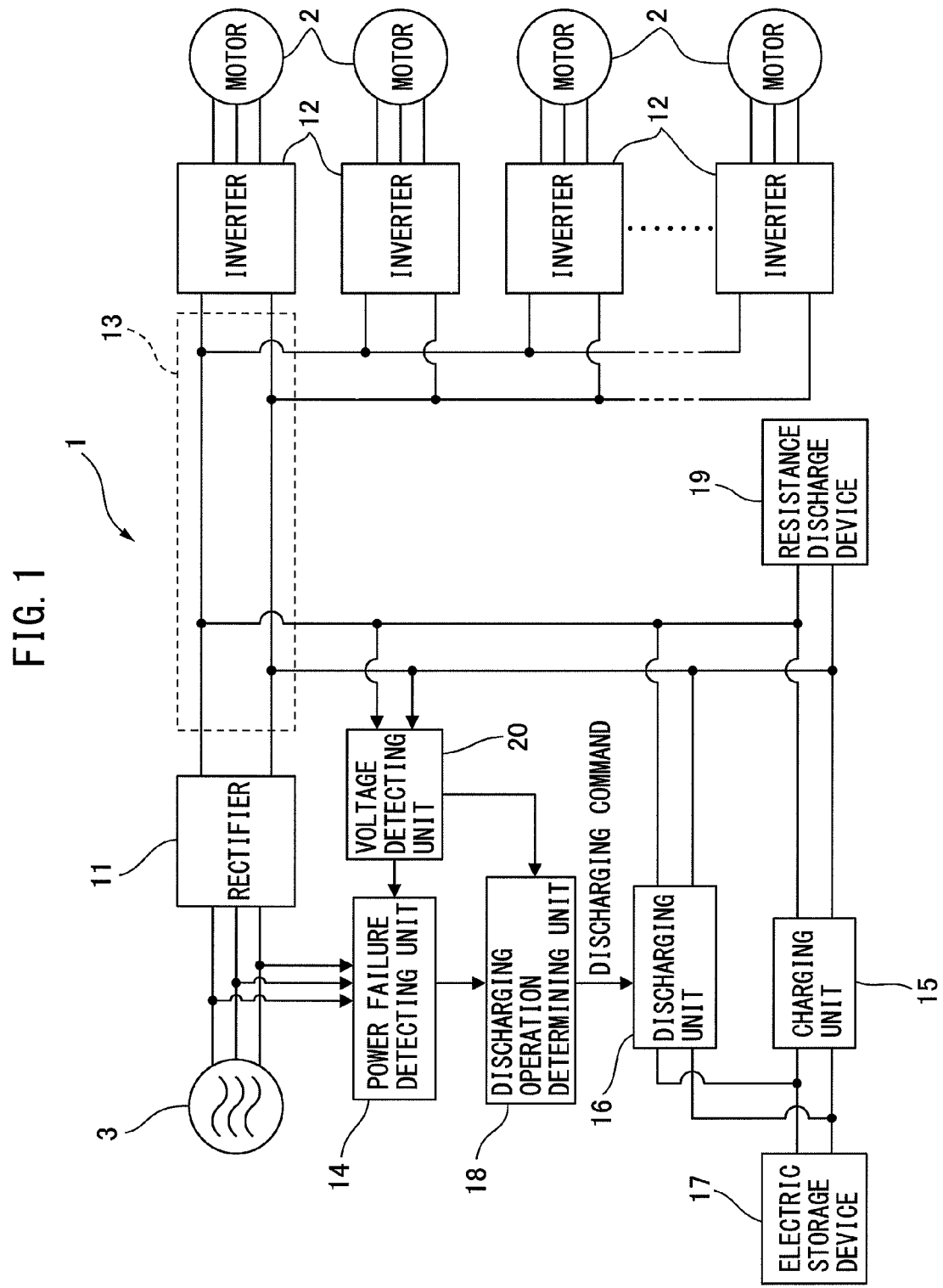
FIG. 1 is a circuit diagram illustrating a motor control device according to a first embodied example.

In the following, a motor control device including an electric storage device and a resistance discharge device will be described by referring to the drawings. However, it should be understood that the present invention is not limited to embodiments illustrated in the drawings or described in the following.

In each embodied example described below, a motor control device that drives and controls a plurality of motors is described. However, the number of the driven and controlled motors does not particularly limit the present invention.

FIG. 1 is a circuit diagram illustrating a motor control device according to a first embodied example. In the following, elements to which the same reference symbols are attached in the different drawings mean the constituent elements with the same functions.

The motor control device 1 according to the first embodied example includes a rectifier 11, inverters 12, a power failure detecting unit 14, a voltage detecting unit 20, an electric storage device 17, a charging unit 15, a discharging unit 16, a discharging operation determining unit 18, and a resistance discharge device 19.

The rectifier 11 rectifies AC power supplied from an AC power supply side where a commercial three-phase AC input power supply 3 exists, to output DC power to a side of a DC link 13 that is a DC side of the rectifier 11. According to the present invention, an embodiment of the used rectifier 11 is not particularly limited. For example, the embodiment of the used rectifier 11 is a three-phase full-wave rectifier circuit with a 120-degree energizing power regeneration function, a rectifier circuit by a PWM control method, or the like.

The rectifier 11 and the inverters 12 are connected to each other via the DC link 13. The inverters 12 are configured as inverting circuits including switching devices inside thereof, such as PWM inverters or the like. Here, driving and controlling a plurality of the motors 2 with the motor control device 1 is taken as an example, therefore, the inverter 12 is provided for each motor 2. The inverter 12 causes the internal switching devices to perform switching operation on the basis of a motor driving command received from a higher-level control device (not illustrated). Thereby, the inverter 12 inverts DC power supplied from a side of the DC link 13 into a three-phase AC power having a desired voltage and a desired frequency that is used for driving the motor 2. The motor 2 operates on the basis of the supplied three-phase AC power of which voltage and frequency are variable. When the motor 2 is braked, regenerative electric power is generated. AC power that is the regenerative electric power generated in the motor 2 is converted into DC power on the basis of a motor driving command received from the higher-level control device, to be returned to the DC link 13. Thus, the inverter 12 performs interconversion of electric power between DC power at the DC link 13 and drive power for the motor 2 or regenerative electric power, which are AC power, on the basis of the received motor driving command.

The power failure detecting unit 14 is provided on the side of the three-phase AC input power supply 3 that supplies AC power to the rectifier 11. The power failure detecting unit 14 uses an AC voltage of the three-phase AC input power supply 3 or a DC voltage at the DC link 13 detected by the voltage detecting unit 20 to detect whether or not power failure occurs on the AC power supply side of the rectifier 11. A detection result of the power failure detecting unit 14 is sent to the discharging operation determining unit 18.

The voltage detecting unit 20 detects a DC voltage value at the DC link 13 between the rectifier 11 and the inverter 12. A detection result of the voltage detecting unit 20 is sent to the power failure detecting unit 14, the discharging operation determining unit 18, and the higher-level control device (not illustrated).

The electric storage device 17 is connected to the DC link 13 via the charging unit 15 and the discharging unit 16 that are described later. The electric storage device 17 can store DC power at the DC link 13, and the electric storage device 17 is constituted by a capacitor or the like. At the electric storage device 17, an electric storage device voltage detecting unit (not illustrated) for detecting a charged voltage is provided. The information on the a charged voltage of the electric storage device 17 detected by the electric storage device voltage detecting unit is sent to the higher-level control device.

Figure 2:
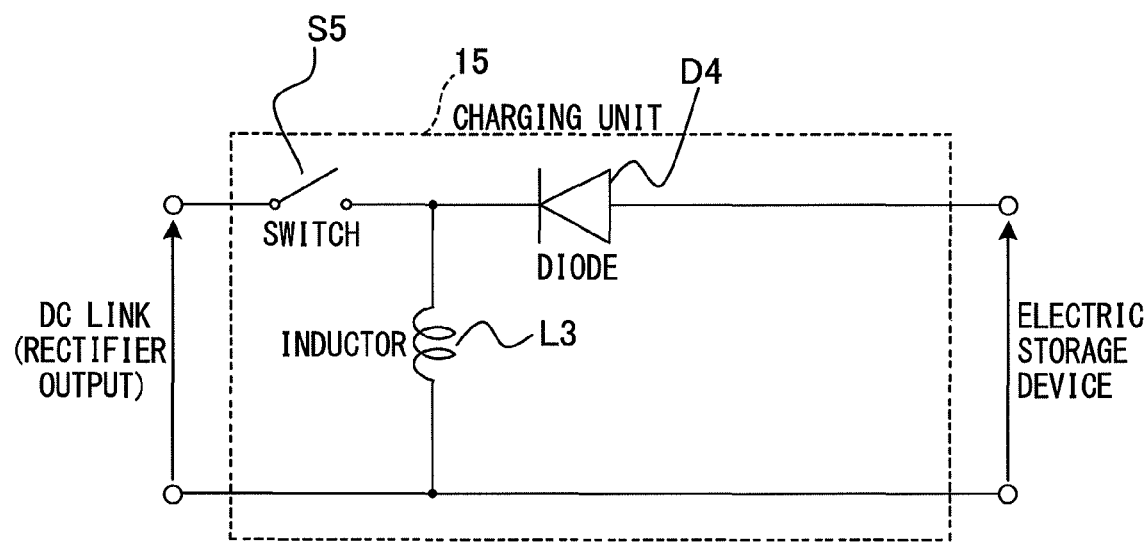
FIG. 2 is a circuit diagram illustrating another concrete example of a charging unit.
Figure 17:
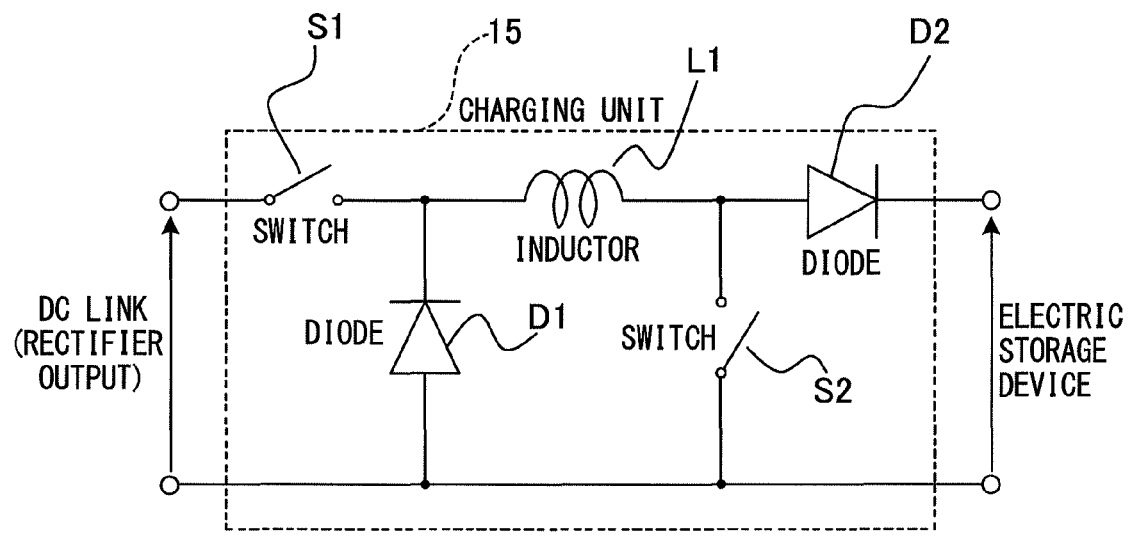
FIG. 17 is a circuit diagram illustrating one concrete example of the charging unit in the motor control device according to Japanese Unexamined Patent Publication No. 2012-158483.

When the charging unit 15 receives a charging command from the higher-level control device, the charging unit 15 brings in DC power at the DC link 13 to the electric storage device 17 to charge the electric storage device 17. At the time of charging the electric storage device 17, the higher-level control device compares a charged voltage of the electric storage device 17 with a DC voltage at the DC link 13 detected by the voltage detecting unit 20 to generate a charging command commanding charging operation of the charging unit 15. The higher-level control device sends this charging command to the charging unit 15. The charging unit 15 has a boosting function of charging the electric storage device 17 at a voltage higher than a DC voltage at the DC link 13. For example, the charging unit 15 is configured by a buck-boost chopper circuit. A configuration itself of the buck-boost chopper circuit does not particularly limit the present invention. For example, the buck-boost chopper circuit described above by referring to FIG. 17 may be used as the charging unit 15. Alternatively, a buck-boost chopper circuit other than the buck-boost chopper circuit illustrated in FIG. 17 may configure the charging unit 15. FIG. 2 is a circuit diagram illustrating another concrete example of the charging unit. As illustrated in FIG. 2, the charging unit 15 may be configured by a buck-boost chopper circuit including a switch S5, a diode D4, and an inductor L3.

Figure 18:
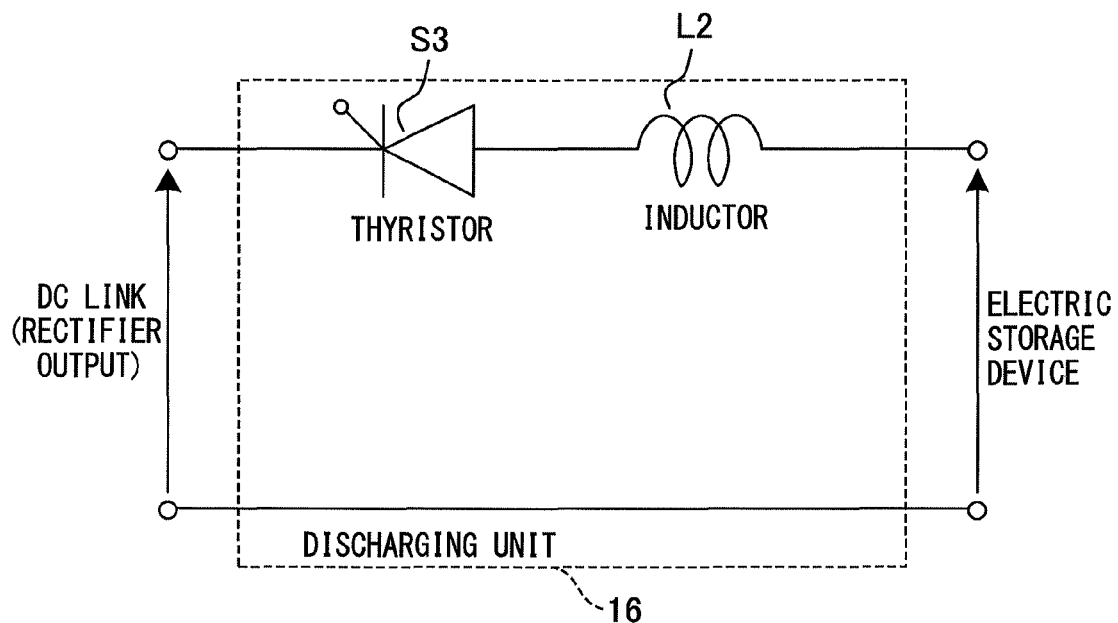
FIG. 18 is a circuit diagram schematically illustrating the discharging unit in the invention described in Japanese Unexamined Patent Publication No. H11-178245.

Returning to description for FIG. 1, when the discharging unit 16 receives a discharging start command from the discharging operation determining unit 18, the discharging unit 16 makes short-circuiting between the electric storage device 17 and the DC link 13 to discharge, to the DC link 13, DC power stored in the electric storage device 17. For example, the discharging unit 16 is the circuit described above by referring to FIG. 18, or the like.

After the power failure detecting unit 14 detects power failure, when a DC voltage value detected by the voltage detecting unit 20 is equal to or smaller than a first threshold, the discharging operation determining unit 18 outputs a discharging start command for operating the discharging unit 16. Details of the first threshold will be described later.

Figure 19:
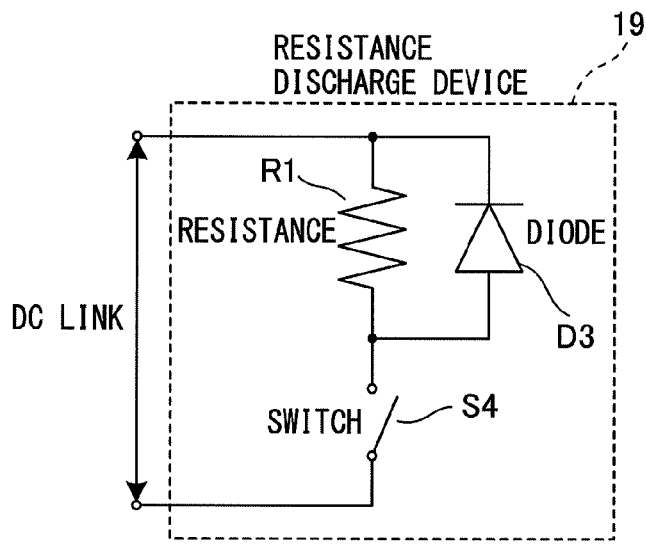
FIG. 19 is a circuit diagram illustrating one concrete example of the resistance discharge device in the motor control device according to Japanese Unexamined Patent Publication No. 2012-158483.
Figure 20:
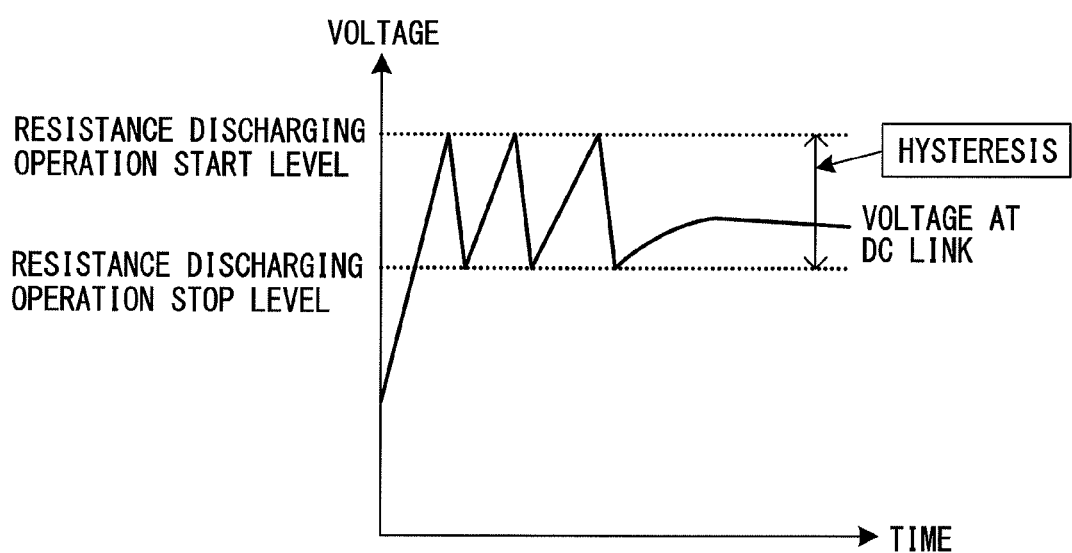
FIG. 20 illustrates one example of fluctuation in a DC voltage at the DC link at the time of power failure operation in the one concrete example of the resistance discharge device in the motor control device according to Japanese Unexamined Patent Publication No. 2012-158483.
Figure 21:
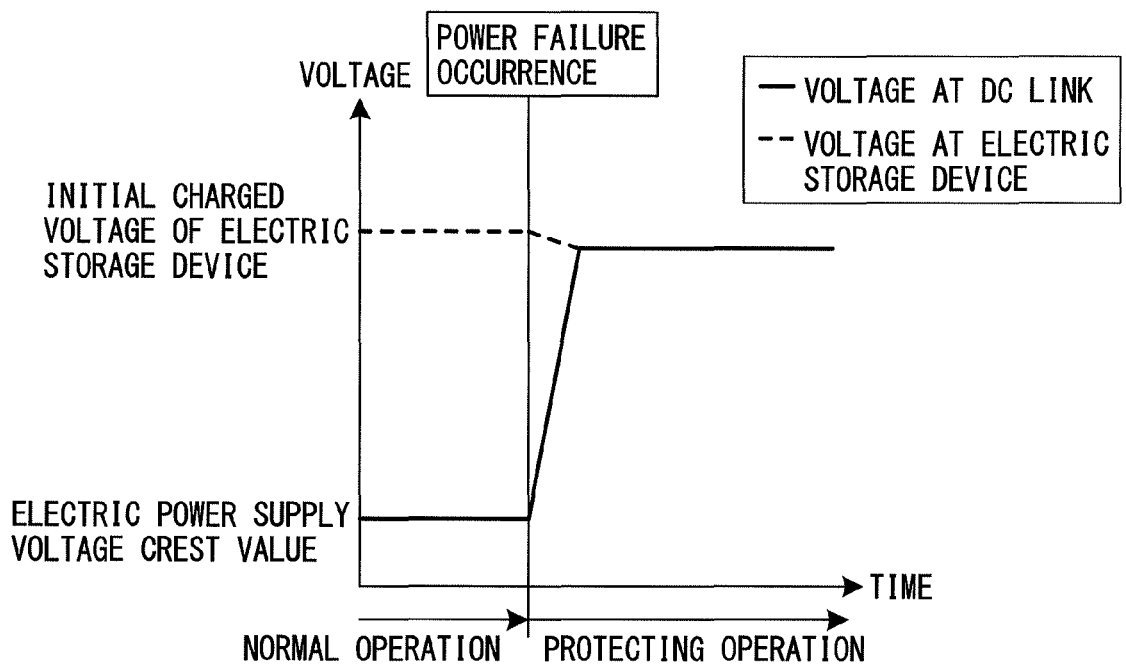
FIG. 21 illustrates voltage fluctuation in a DC link and voltage fluctuation in an electric storage device when power failure occurs under motor stop, and DC power is supplied from the electric storage device to the DC link, in a situation where the electric storage device is boosted and charged by using a charging unit with a boosting function.

The resistance discharge device 19 is connected to the DC link 13. After the power failure detecting unit 14 detects power failure, when a DC voltage value detected by the voltage detecting unit 20 is equal to or higher than a resistance discharging start level, the resistance discharge device 19 starts resistance discharge operation of consuming DC power at the DC link 13 by resistance discharge. When a DC voltage value detected by the voltage detecting unit 20 is equal to or lower than a resistance discharging stop level that is lower than the resistance discharging start level, the resistance discharge device 19 stops the resistance discharging operation. A configuration itself of the resistance discharge device 19 does not particularly limit the present invention, and the circuit described above by referring to FIG. 19 may be used, for example.

Here, the first threshold set in the motor control device 1 according to the first embodied example will be described.

After the power failure detecting unit 14 detects power failure, when a DC voltage value detected by the voltage detecting unit 20 is equal to or lower than the first threshold, the discharging operation determining unit 18 outputs a discharging start command for operating the discharging unit 16. In other words, according to the first embodied example, DC power stored in the electric storage device 17 is not discharged to the DC link 13 immediately after the power failure detecting unit 14 detects a power failure on the AC power supply side. Instead, DC power stored in the electric storage device 17 is discharged to the DC link 13 when that a DC voltage value detected by the voltage detecting unit 20 becomes equal to or lower than the first threshold after the power failure detecting unit 14 detects a power failure.

In the protecting operation when power failure occurs at the AC power supply side, DC power needs to be supplied from the electric storage device 17 to the DC link 13 at the time of motor power running operation in which DC power at the DC link 13 is consumed at the motor 2 via the inverter 12. However, electric power does not need to be supplied from the electric storage device 17 at the time of motor regenerating operation in which DC power is returned to the DC link 13 via the inverter 12. In view of the above, according to the first embodied example, when power failure occurs at the AC power supply side, timing of starting DC power supply from the electric storage device 17 to the DC link 13 is adjusted in accordance with a DC voltage at the DC link 13. The concrete contents are as follows.

Figure 3:
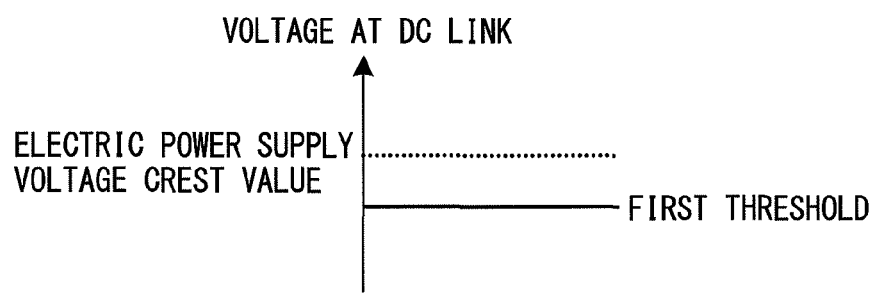
FIG. 3 illustrates a first threshold set in the motor control device according to the first embodied example.

FIG. 3 illustrates the first threshold set in the motor control device according to the first embodied example. As illustrated in FIG. 3, in order to make the electric storage device 17 not to supply DC power to the DC link 13 from the time immediately after the power failure detection by the power failure detecting unit 14, the first threshold is set in advance to be equal to or lower than a crest value of an input voltage at the AC power supply side of the rectifier 11. After power failure on the AC power supply side is detected by the power failure detecting unit 14, when a DC voltage value of the DC link 13 detected by the voltage detecting unit 20 becomes equal to or lower than the first threshold, the discharging operation determining unit 18 commands the discharging unit 16 with a discharging start command for operating the discharging unit 16. When the discharging unit 16 receives the discharging start command from the discharging operation determining unit 18, the discharging unit 16 makes short-circuiting between the electric storage device 17 and the DC link 13. Thereby, the discharging operation of the electric storage device 17 is started, and DC power stored in the electric storage device 17 is supplied to the DC link 13.

Figure 4A:
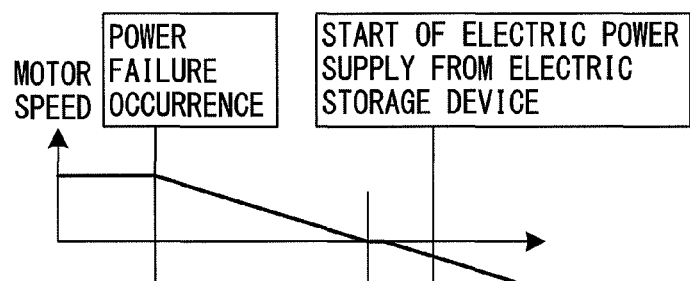
FIG. 4A illustrates voltage fluctuation in the DC link and the electric storage device in the motor control device according to the first embodied example when power failure occurs under motor rotation and DC power is supplied from the electric storage device to the DC link, and illustrates a motor speed.
Figure 4B:
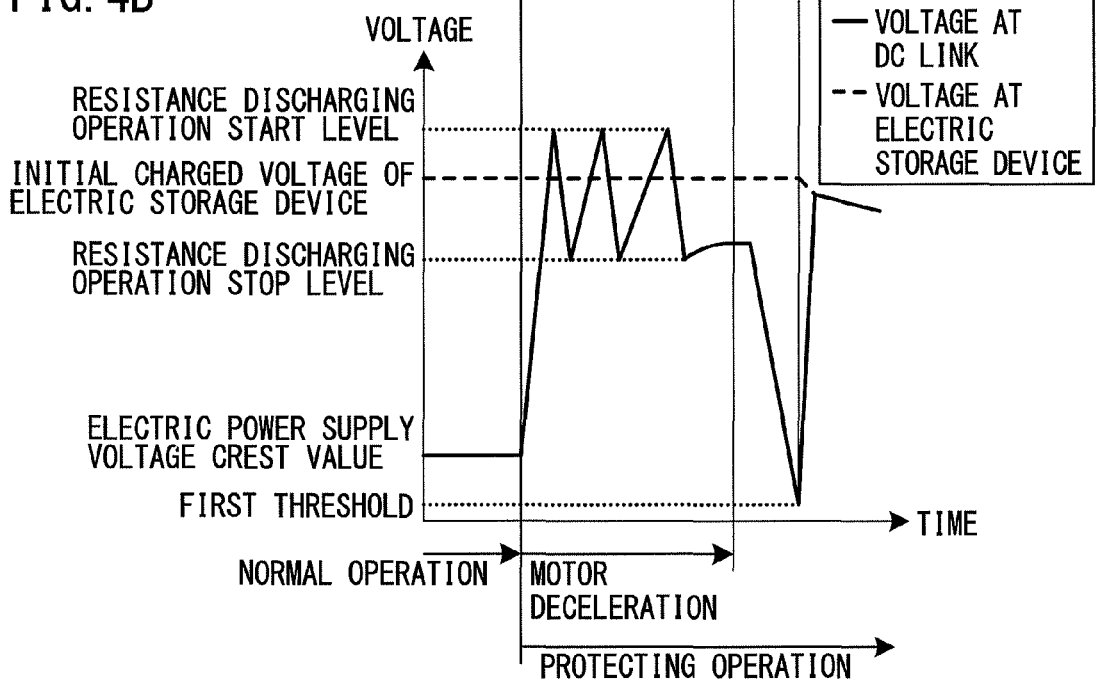
FIG. 4B illustrates voltage fluctuation in the DC link and the electric storage device in the motor control device according to the first embodied example when power failure occurs under motor rotation, and DC power is supplied from the electric storage device to the DC link, and illustrates voltages at the DC link and the electric storage device.

FIG. 4A and FIG. 4B illustrate voltage fluctuation in the DC link and the electric storage device in the motor control device according to the first embodied example when power failure occurs under motor rotation and DC power is supplied from the electric storage device to the DC link. FIG. 4A illustrates a motor speed, and FIG. 4B illustrates voltages at the DC link and the electric storage device.

When power failure occurs under motor rotation, the protecting operation such as evacuation of a machining target or a tool is started, and the motor 2 is decelerated. After power failure at the AC power supply side is detected by the power failure detecting unit 14, a DC voltage at the DC link 13 is equal to or higher than the first threshold for some time, in a motor deceleration period immediately after the start of the protecting operation. Accordingly, DC power is not started to be supplied from the electric storage device 17 to the DC link 13. When the protecting operation is started and the motor 2 is decelerated, regenerative electric power from the motor 2 is returned to the DC link 13 by the protecting operation so that a DC voltage at the DC link 13 fluctuates. In other words, when a DC voltage at the DC link 13 reaches the resistance discharging operation start level set in advance, the resistance discharge device 19 starts resistance discharging operation. Then, DC power of the DC link 13 is consumed as heat energy so that a DC voltage at the DC link declines. However, when a DC voltage at the DC link 13 declines to the resistance discharging operation stop level, the resistance discharge device 19 stops the resistance discharging operation. Accordingly, a voltage at the DC link 13 rises by regenerative electric power from the motor 2. When the motor 2 completely stops, the regenerative electric power from the motor 2 is no longer returned to the DC link 13. Accordingly, the motor 2 is successively accelerated by the protecting operation, and thereby, DC power at the DC link 13 continues to be consumed so that a DC voltage at the DC link 13 continues to decline. When the discharging operation determining unit 18 determines that a DC voltage value of the DC link 13 detected by the voltage detecting unit 20 is equal to or lower than the first threshold, the discharging operation determining unit 18 commands the discharging unit 16 with a discharging start command for operating the discharging unit 16. The discharging unit 16 receives the discharging start command from the discharging operation determining unit 18 to make short-circuiting between the electric storage device 17 and the DC link 13. Thereby, the discharging operation of the electric storage device 17 is started, and DC power stored in the electric storage device 17 is supplied to the DC link 13. The DC power that is supplied from the electric storage device 17 to the DC link 13 is inverted into AC power by the inverter 12. This AC power is used as a driving energy source to perform the protecting operation such as evacuation of a machining target or a tool.

Thus, after power failure at the AC power supply side is detected by the power failure detecting unit 14, when a DC voltage value of the DC link 13 detected by the voltage detecting unit 20 becomes equal to or lower than the first threshold, the discharging operation determining unit 18 commands the discharging unit 16 with a discharging start command for operating the discharging unit 16. For this reason, even when the motor deceleration immediately after the start of the protecting operation causes a voltage of the DC link 13 to rise to reach the resistance discharging operation start level, and the resistance discharging operation by the resistance discharge device 19 is performed, DC power is not started to be supplied from the electric storage device 17 to the DC link 13. Accordingly, DC power stored in the electric storage device 17 is not consumed by the resistance discharge device 19. In other words, according to the first embodied example, during a period from the time after the power failure detecting unit detects power failure to the time that a DC voltage value detected by the voltage detecting unit 20 becomes equal to or lower than the first threshold, a discharging start command is not output from the discharging operation determining unit 18, and the charging unit 16 does not operate. Thereby, DC power stored in the electric storage device 17 is prevented from being consumed by the resistance discharge device 19. More specifically, according to the first embodied example, it is possible to efficiently use the energy that is stored in the electric storage device 17 as energy for the protecting operation at the time of power failure, there is no possibility of energy used for the protecting operation to run short, which makes it possible to reliably perform the desired protecting operation.

Next, a motor control device according to a second embodied example will be described. In the above-described first embodied example, the timing of starting DC power supply from the electric storage device 17 to the DC link 13 performed after power failure occurrence at the AC power supply side is adjusted by setting the first threshold. Meanwhile, according to the second embodied example, a second threshold for adjusting the timing of stopping DC power supply from the electric storage device 17 to the DC link 13 is set in addition to the first threshold for adjusting the timing of starting DC power supply from the electric storage device 17 to the DC link 13.

Figure 5:
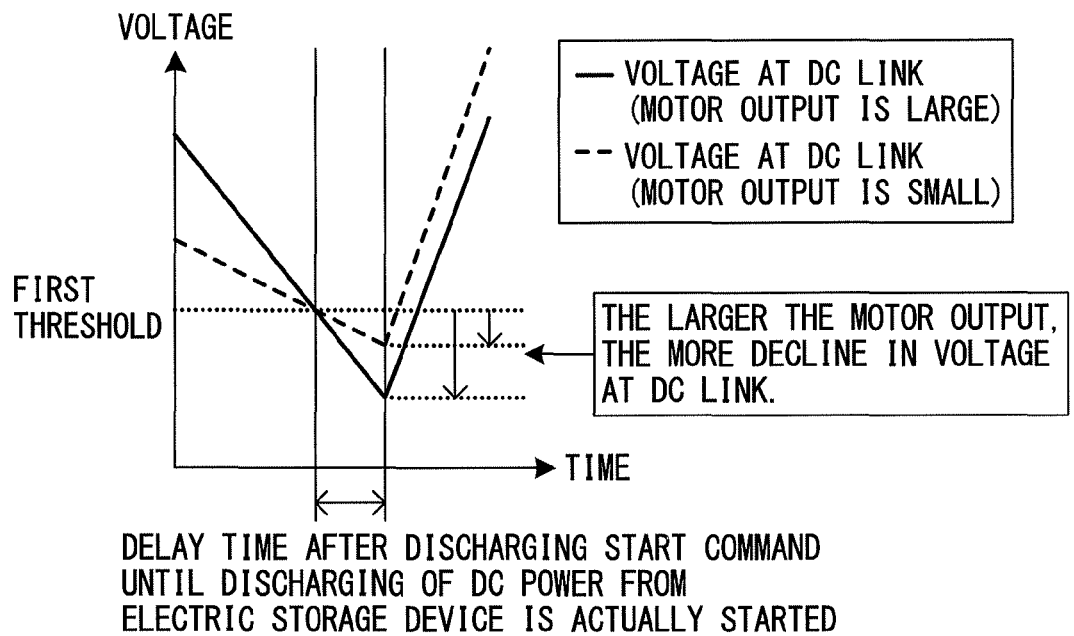
FIG. 5 illustrates an example of a DC voltage at the DC link in the motor control device according to the first embodied example immediately after start of DC power discharge from the electric storage device.

FIG. 5 illustrates an example of a DC voltage at the DC link in the motor control device according to the first embodied example immediately after start of DC power discharge from the electric storage device. In FIG. 5, a DC voltage of the DC link 13 when motor output is large is drawn by the continuous line, and a DC voltage at the DC link 13 when motor output is small is drawn by the dashed line. In the above-described first embodied example, from the time that the discharging operation determining unit 18 commands the discharging unit 16 to start discharging, to the time that discharge of DC power from the electric storage device 17 is actually started, there is delay time due to notification delay of the discharging start command and hardware delay to switching-on. For this reason, even when the discharging operation determining unit 18 outputs a discharging start command to the discharging unit 16 as illustrated in FIG. 5, a DC voltage at the DC link 13 still continues to decline until the discharging unit 16 actually operates to start discharging DC power from the electric storage device 17. As illustrated in FIG. 5, in a motor power running state, as motor output becomes larger, DC power at the DC link 13 is more consumed. Accordingly, declining gradient of a voltage at DC link 13 becomes larger, and a degree of DC voltage decline at the DC link 13 becomes larger as well during a period from the time that the discharging operation determining unit 18 outputs a discharging start command to the discharging unit 16, to the time that discharge of DC power from the electric storage device 17 is actually started. Large decline of a DC voltage at the DC link 13 increases a possibility that a DC voltage at the DC link 13 becomes lower than a DC voltage value of the DC link 13 that enables the motor 2 to normally perform the protecting operation, before start of electric power supply from the electric storage device after power failure occurrence.

According to the second embodied example, in order to make it possible to set the first threshold to be equal to or higher than a crest value of an input voltage for the purpose of avoiding the above-described problem, the discharging operation determining unit 18 outputs a discharging stop command for stopping the discharging unit 16 when a DC voltage value at the DC link 13 detected by the voltage detecting unit 20 becomes equal to or larger than the second threshold after the power failure detecting unit 14 detects power failure. In the following, the operational principle will be described in detail.

Figure 6:
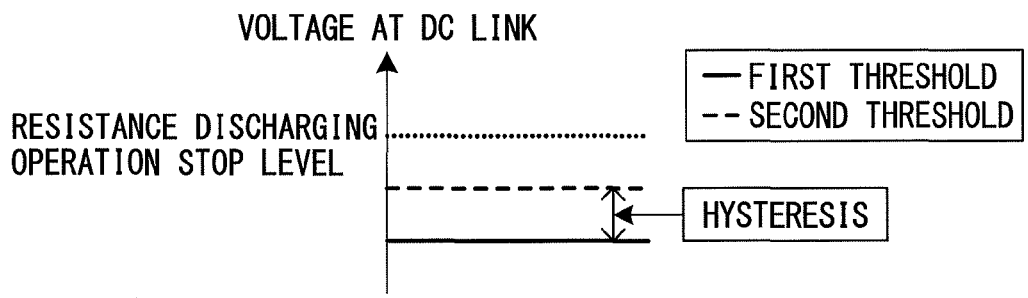
FIG. 6 illustrates the first threshold and a second threshold set in a motor control device according to a second embodied example.

FIG. 6 illustrates the first threshold and the second threshold set in the motor control device according to the second embodied example. As illustrated in FIG. 6, the second threshold is set to be larger than the first threshold. A hysteresis is given between the first threshold and the second threshold. Further, to supply electric power from the electric storage device 17 while the resistance discharging operation by the resistance discharge device 19 is steadily stopped, the second threshold is set to be equal to or lower than the resistance discharging operation stop level.

In the above-described first embodied example, the first threshold is set to be equal to or lower than a crest value of an input voltage at the AC power supply side of the rectifier 11. However, according to the second embodied example, the first threshold does not need to be set to be equal to or lower than a crest value of an input voltage on the AC power supply side. For example, the first threshold may be set to be equal to or higher than a crest value of an input voltage at the AC power supply side. The reason for this will be described in the following.

FIG. 7A and FIG. 7B illustrate voltage fluctuation of the DC link and the electric storage device in the motor control device according to the second embodied example when power failure occurs under motor rotation, and DC power is supplied from the electric storage device to the DC link. FIG. 7A illustrates a motor speed, and FIG. 7B illustrates voltages at the DC link and the electric storage device.

When power failure occurs under motor rotation, the protecting operation such as evacuation of a machining target or a tool is started, and the motor 2 is decelerated. After power failure at the AC power supply side is detected by the power failure detecting unit 14, a DC voltage at the DC link 13 is equal to or lower than the first threshold for some time. Accordingly, the discharging operation determining unit 18 outputs a discharging start command, and the electric storage device 17 thereby supplies DC power to the DC link 13 immediately after the power failure detecting unit 14 detects power failure. This supply of DC power from the electric storage device 17 to the DC link 13 and generation of regenerative electric power of the motor 2 increase a DC voltage at the DC link 13. Then, at the timing when a voltage of the DC link 13 exceeds the second threshold, the discharging operation determining unit 18 outputs, to the discharging unit 16, a discharging stop command for stopping the operation of the discharging unit 16. However, when a switch (FIG. 18) of the discharging unit 16 is configured by a device that is difficult to be instantly turned off, like a thyristor, the discharging unit 16 is difficult to instantly make disconnection between the electric storage device 17 and the DC link 13 at the time of receiving a discharging stop command, and the electric storage device 17 stays connected to the DC link 13. Then, a charged voltage of the electric storage device 17 and a DC voltage at the DC link 13 become equal to each other. Further, when only a DC voltage at the DC link 13 rises, an electric current stops flowing through the thyristor so that the device is turned off. At this timing, the electric storage device 17 is finally disconnected from the DC link 13. Still further, when the motor 2 continues to be decelerated, regenerative electric power of the motor 2 is returned to the DC link 13, and a DC voltage at the DC link 13 continues to rise. When a DC voltage at the DC link 13 reaches the resistance discharging operation start level set in advance, the resistance discharge device 19 starts the resistance discharging operation, and DC power at the DC link 13 is consumed as heat energy. However, at this timing, the electric storage device 17 is disconnected from the DC link 13. Accordingly, although DC power at the DC link 13 is consumed, DC power stored in the electric storage device 17 is not consumed. When the discharging operation determining unit 18 determines that a DC voltage value at the DC link 13 detected by the voltage detecting unit 20 becomes equal to or lower than the first threshold, the discharging operation determining unit 18 commands the discharging unit 16 with a discharging start command for operating the discharging unit 16. The discharging unit 16 receives the discharging start command from the discharging operation determining unit 18, and makes short-circuiting between the electric storage device 17 and the DC link 13. Thereby, the discharging operation of the electric storage device 17 is started, and DC power stored in the electric storage device 17 is supplied to the DC link 13. The DC power that is supplied from the electric storage device 17 to the DC link 13 is inverted into AC power by the inverter 12. This AC power is used as a driving energy source to perform the protecting operation such as evacuation of a machining target or a tool.

As described above, according to the second embodied example, DC power stored in the electric storage device 17 is not consumed by the resistance discharge of the resistance discharge device 19. For this reason, the first threshold does not need to be set to be equal to or lower than a crest value of an input voltage at the AC power supply side. For example, the first threshold may be set to be equal to or higher than a crest value of an input voltage at the AC power supply side. Thus, according to the second embodied example, DC power stored in the electric storage device 17 is not consumed by the resistance discharge of the resistance discharge device 19 immediately after power failure occurrence. For this reason, it is possible to efficiently use the energy stored in the electric storage device 17 as energy for the protecting operation at the time of power failure, there is no longer a possibility that energy used for the protecting operation runs short, and the desired protecting operation can be performed reliably. Further, it becomes less possible that a DC voltage at the DC link 13 becomes lower than the DC voltage value at the DC link 13 that enables the motor 2 to normally perform the protecting operation, before start of electric power supply from the electric storage device.

Figure 8:
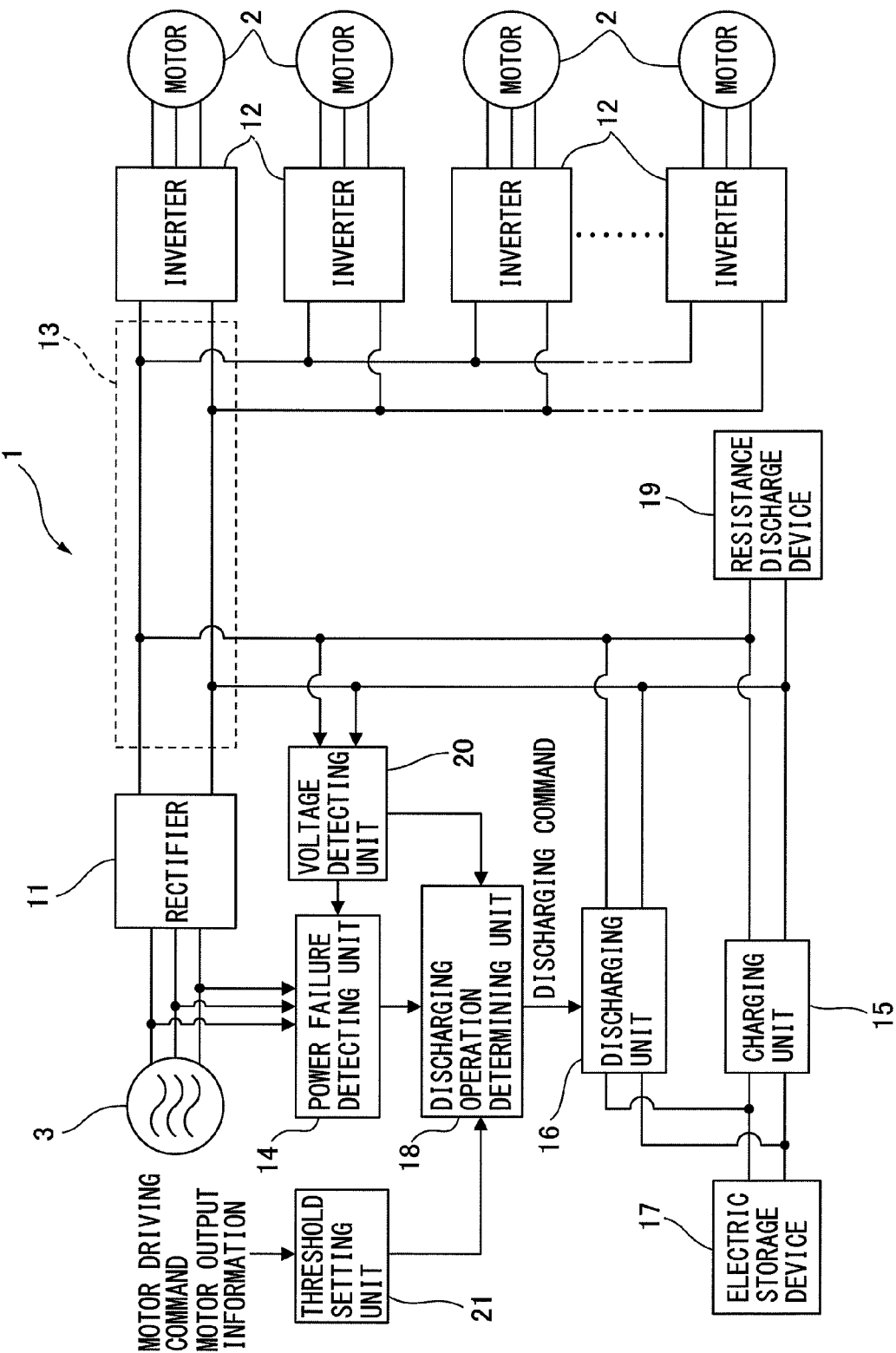
FIG. 8 is a circuit diagram illustrating a motor control device according to a third embodied example.
Figure 9:
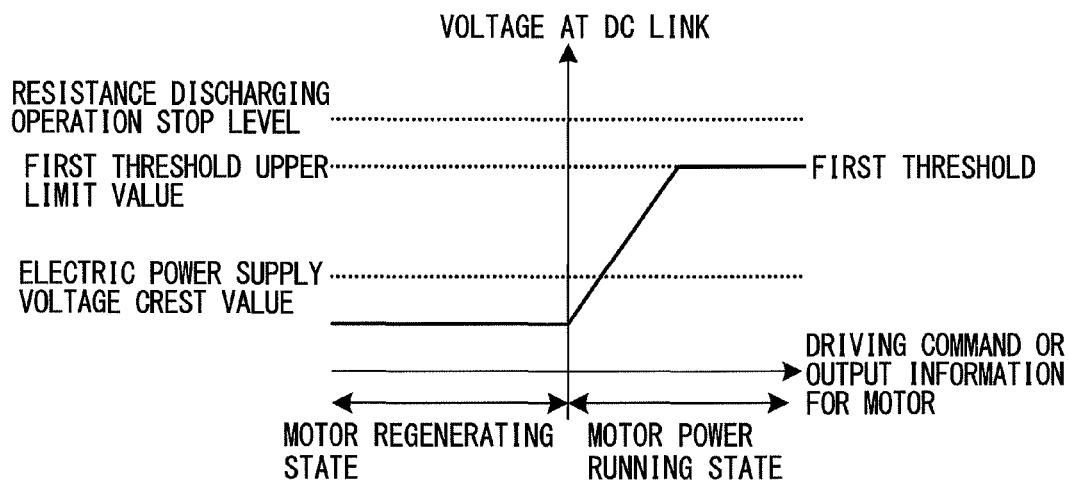
FIG. 9 illustrates setting of the first threshold in a threshold setting unit in the motor control device according to the third embodied example.

Next, a motor control device according to a third embodied example will be described. FIG. 8 is a circuit diagram illustrating a motor control device according to the third embodied example. FIG. 9 illustrates setting of the first threshold in a threshold setting unit in the motor control device according to the third embodied example. In the third embodied example, the threshold setting unit 21 is added to the first embodied example. The threshold setting unit 21 sets the first threshold in accordance with a motor driving command commanding operation of the motor 2, or motor output information that is information concerning output of motor 2 that operates on the basis of the motor driving command. The motor driving command is input from a higher-level control device (not illustrated) to the threshold setting unit 21. The motor output information is calculated when the motor 2 operates on the basis of the motor driving command. The motor output information is calculated by a publicly known method using a parameter such as a motor applying voltage, a motor electric current, a rotational speed of the motor, and the like. The other circuit constituent elements are the same as the circuit constituent elements illustrated in FIG. 1. Accordingly, the same reference symbols are attached to the same circuit constituent elements, and detailed description of the same circuit constituent elements is omitted.

In FIG. 9, a motor driving command and motor output information is positive when the motor 2 is in a motor power running state in which the motor 2 consumes electric power, a motor driving command and motor output information is negative when the motor 2 is in a motor regenerating state in which the motor 2 regenerates electric power, and a motor driving command and motor output information is zero when the motor 2 is in a no-load state.

As illustrated in FIG. 9, when a motor driving command or motor output information indicates that the motor 2 is in the regenerating state in which the motor 2 regenerates electric power, the threshold setting unit 21 sets the first threshold to be equal to or lower than a crest value of an input voltage at the AC power supply side of the rectifier 11. The reason why the first threshold is set to be equal to or lower than a crest value of an input voltage at the AC power supply side of the rectifier 11 when there is indication that the motor 2 is in the regenerating state in which the motor 2 regenerates electric power is to prevent the electric storage device 17 from supplying DC power to the DC link 13 from the time immediately after power failure occurrence, as described above by referring to FIG. 3.

Further, as illustrated in FIG. 9, when a motor driving command or motor output information indicates that the motor 2 is in the power running state in which the motor consumes electric power, the threshold setting unit 21 sets the first threshold to be set to be lower than the resistance discharging stop level, in accordance with magnitude of acceleration indicated by the motor driving command or magnitude of motor output indicated by the motor output information. In other words, the larger the magnitude of acceleration indicated by the motor driving command or the magnitude of motor output indicated by the motor output information is, the larger value of the first threshold in the motor power running state is set by the threshold setting unit 21. An upper limit of the first threshold is a value lower than the resistance discharging stop level.

A gradient that increases the first threshold in the motor power running state (i.e., a ratio of increase in the first threshold to increase in the motor driving command or the motor output information) is set in advance in accordance with energy stored in the DC link 13 in the system excluding the electric storage device 17. For example, the gradient is set so as to be inversely proportional to energy stored in the DC link 13. In other words, when energy stored in the DC link 13 is large, the gradient is set to be small, and when energy stored in the DC link 13 is small, the gradient is set to be large. Alternatively, on the assumption that a DC voltage at the DC link 13 is V[V], and a capacitor capacitance that the DC link 13 has is C[F], energy P[J] stored in the DC link 13 is $P=CV^2/2$. Accordingly, the gradient may be set in accordance with a capacitor capacitance that the DC link 13 has. In order to start DC power supply from the electric storage device 17 to the DC link 13 in the motor power running state and in a state in which the resistance discharging operation by the resistance discharge device 19 is firmly stopped, the threshold setting unit 21 sets the upper limit value equal to or lower than the resistance discharging operation stop level, for the first threshold in the motor power running state. In other words, when the first threshold in the motor power running state reaches the upper limit value, the threshold setting unit 21 clamps the first threshold at the upper limit value.

Figure 10:
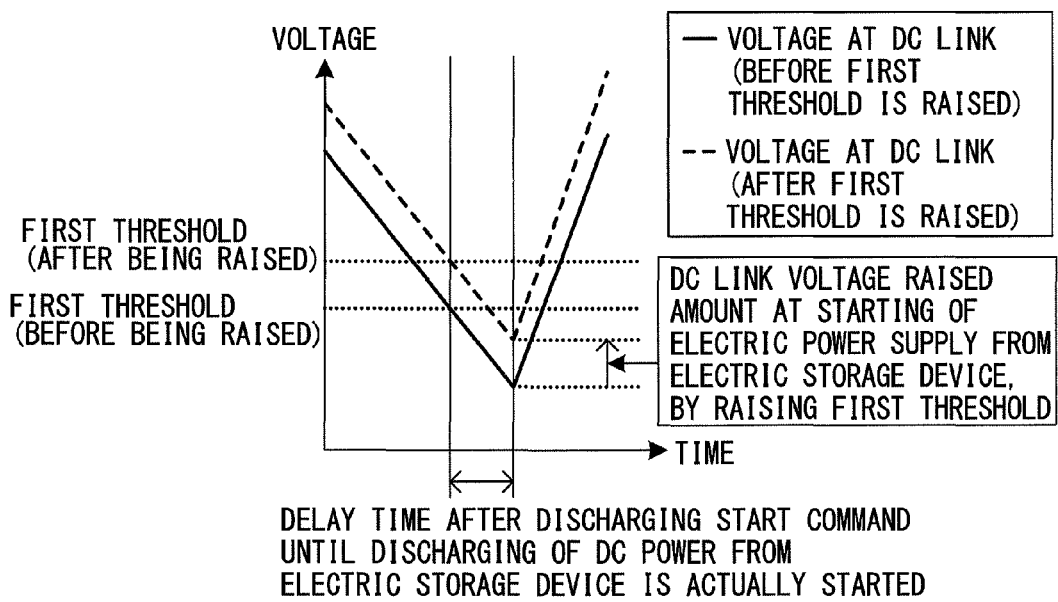
FIG. 10 illustrates an example of a DC voltage at the DC link in the motor control device according to the third embodied example immediately after start of DC power discharge from the electric storage device.

FIG. 10 illustrates an example of a DC voltage at the DC link in the motor control device according to the third embodied example immediately after start of DC power discharge from the electric storage device. As described above by referring to FIG. 5, in the first embodied example, because of notification delay of a discharging start command from the discharging operation determining unit 18, and hardware delay of the discharging unit 16 to switching-on, a DC voltage at the DC link 13 continues to decline in a period from the time that the discharging operation determining unit 18 outputs a discharging start command to the discharging unit 16 to the time that discharge of DC power from the electric storage device 17 is actually started. As illustrated in FIG. 5, in the motor power running state, as motor output becomes larger, DC power of the DC link 13 is more consumed, and accordingly, a declining degree of a DC voltage at the DC link 13 becomes larger as well. Large decline of a DC voltage at the DC link 13 increases a possibility that a DC voltage at the DC link 13 becomes lower than the DC voltage value at the DC link 13 that enables the motor 2 to normally perform the protecting operation, before start of electric power supply from the electric storage device 17 after power failure occurrence. Regarding this, according to the third embodied example, as illustrated in FIG. 10, the first threshold is more raised as a motor driving command or motor output information becomes larger, in the motor power running state. For this reason, a DC voltage at the DC link 13 is made higher at the timing that supply of DC power from the electric storage device 17 to the DC link 13 is actually started. This eliminates a possibility that energy used for the protecting operation runs short after power failure occurrence and before start of DC power supply from the electric storage device 17. Accordingly, the desired protecting operation can be performed reliably. Further, it becomes less possible that a DC voltage at the DC link 13 becomes lower than the DC voltage value at the DC link 13 that enables the motor 2 to normally perform the protecting operation, before start of electric power supply from the electric storage device 17.

Figure 11:
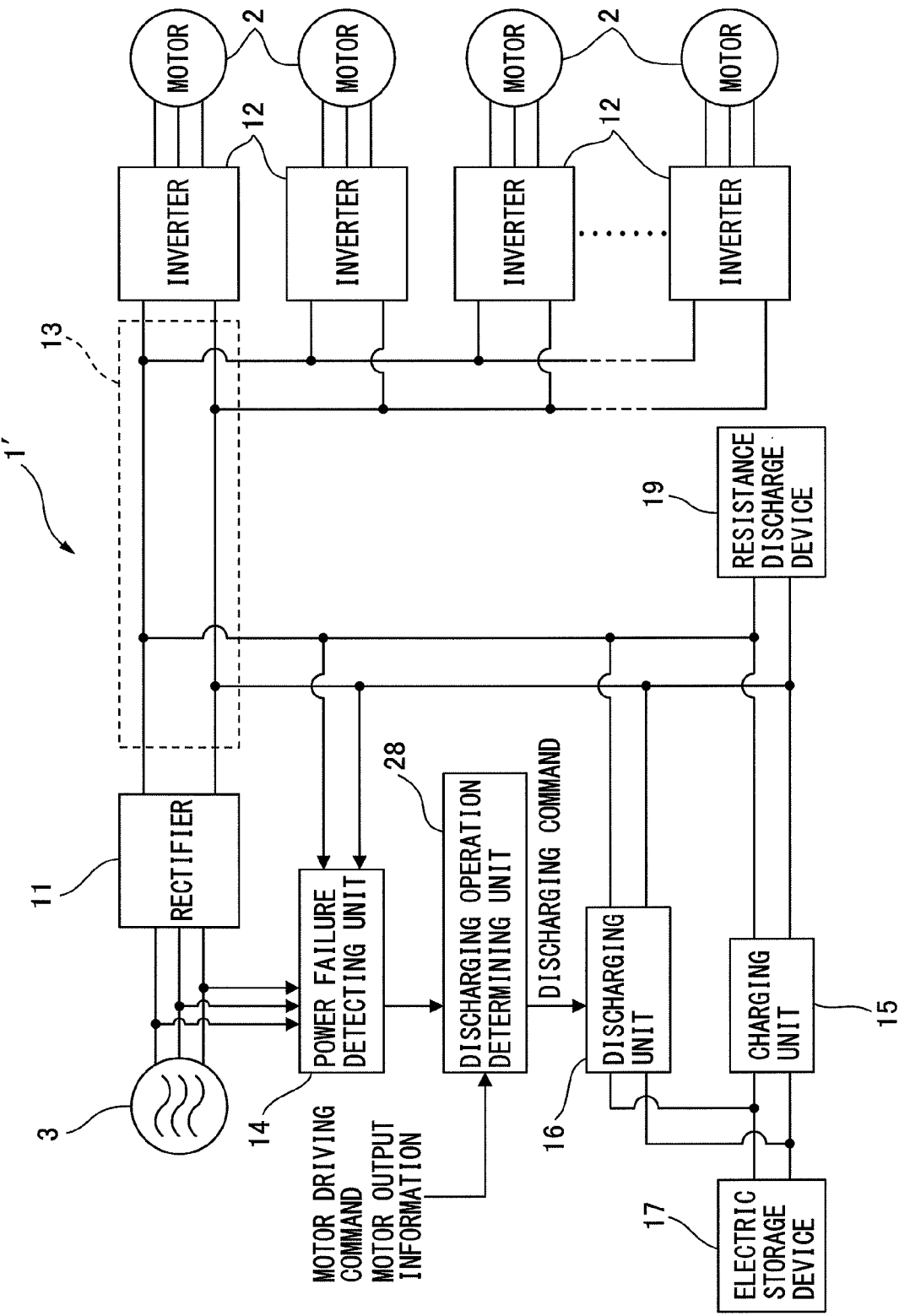
FIG. 11 is a circuit diagram illustrating a motor control device according to a fourth embodied example.

Next, a motor control device according to a fourth embodied example will be described. FIG. 11 is a circuit diagram illustrating the motor control device according to the fourth embodied example.

A motor control device 1' according to the fourth embodied example includes the rectifier 11, the inverters 12, the power failure detecting unit 14, the electric storage device 17, the charging unit 15, the discharging unit 16, a discharging operation determining unit 28, and the resistance discharge device 19. Since the rectifier 11, the inverters 12, the power failure detecting unit 14, the electric storage device 17, the charging unit 15, the discharging unit 16, and the resistance discharge device 19 are the same as described by referring to FIG. 1, detailed description thereof is omitted. In FIG. 11, the voltage detecting unit that detects a DC voltage value at the DC link 13 between the rectifier 11 and the inverter 12 is not illustrated. However, a detection result of the voltage detecting unit is sent to the power failure detecting unit and the higher-level control device (not illustrated).

After the power failure detecting unit 14 detects a power failure, the discharging operation determining unit 28 outputs a discharging start command for operating the discharging unit 16 when a motor driving command that commands power running operation of the motor 2 or motor output information which is information on the output of the motor 2 performing power running operation on the basis of the motor driving command, is equal to or higher than a third threshold.

As described above, in the protecting operation after power failure occurrence, DC power needs to be supplied from the electric storage device 17 to the DC link 13 at the time of the motor power running operation in which energy of the DC link is consumed. On the other hand, DC power does not need to be supplied from the electric storage device 17 to the DC link 13 at the time of the motor regenerating operation in which energy is returned to the DC link 13. Thereby, according to the fourth embodied example, when a motor driving command or motor output information indicates the motor power running state after the power failure detecting unit 14 detects power failure, the discharging operation determining unit 28 outputs a discharging start command for operating the discharging unit 16, when the motor driving command or the motor output information is equal to or higher than the third threshold. Accordingly, when the motor 2 is in the motor power running state after power failure occurrence, the discharging unit 16 makes short-circuiting between the electric storage device 17 and the DC link 13 to discharge, to the DC link 13, DC power stored in the electric storage device 17, when the motor driving command or the motor output information is higher than the third threshold.

Figure 12:
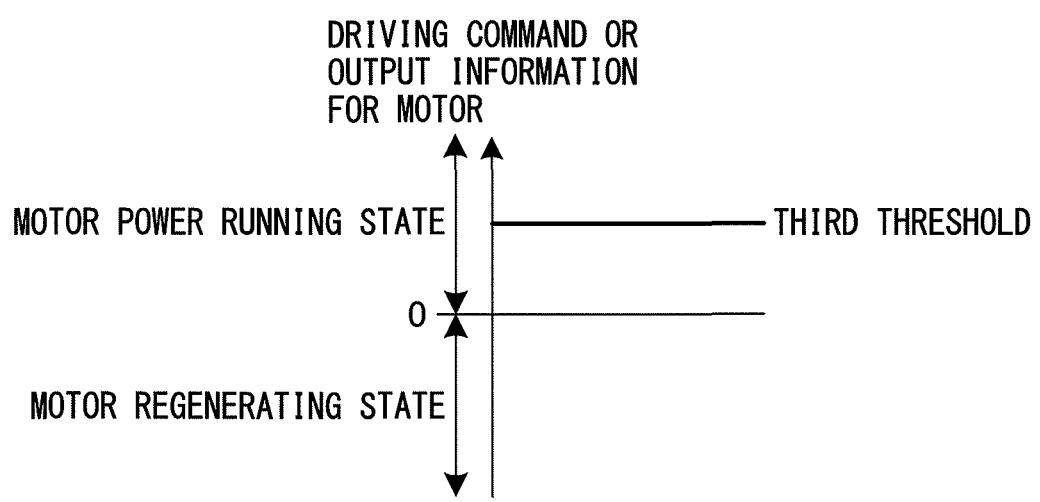
FIG. 12 illustrates a third threshold set in the motor control device according to the fourth embodied example.

The third threshold set in the motor control device 1' according to the fourth embodied example will be described. FIG. 12 illustrates the third threshold set in the motor control device according to the fourth embodied example. In FIG. 12, a motor driving command or motor output information is positive in the case of the motor power running state in which the motor 2 consumes electric power, a motor driving command or motor output information is negative in the case of the motor regenerating state in which the motor 2 regenerates electric power, and a motor driving command or motor output information is zero in the no-load state.

According to the fourth embodied example, as illustrated in FIG. 12, in order not to make the electric storage device 17 to supply DC power to the DC link 13 immediately after power failure detection by the power failure detecting unit 14, the third threshold is set when a motor driving command or motor output information indicates the motor power running state. The third threshold is set in accordance with magnitude of acceleration indicated by a motor driving command, or magnitude of output of the motor indicated by motor output information.

Figure 13A:
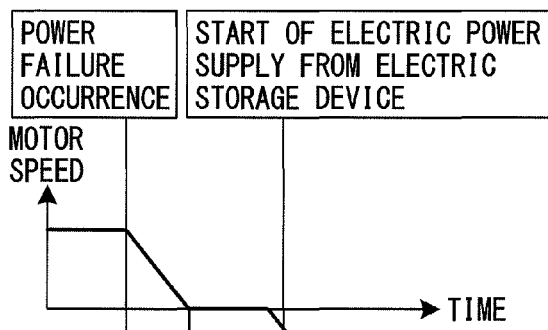
FIG. 13A illustrates voltage fluctuation of the DC link and the electric storage device in the motor control device according to the fourth embodied example when power failure occurs under motor rotation, and the electric storage device supplies DC power to the DC link, and illustrates a motor speed.
Figure 13B:
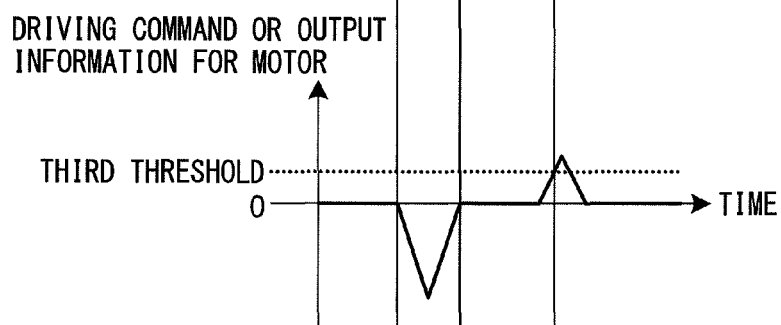
FIG. 13B illustrates voltage fluctuation of the DC link and the electric storage device in the motor control device according to the fourth embodied example when power failure occurs under motor rotation, and the electric storage device supplies DC power to the DC link, and illustrates a motor driving command or motor output information.
Figure 13C:
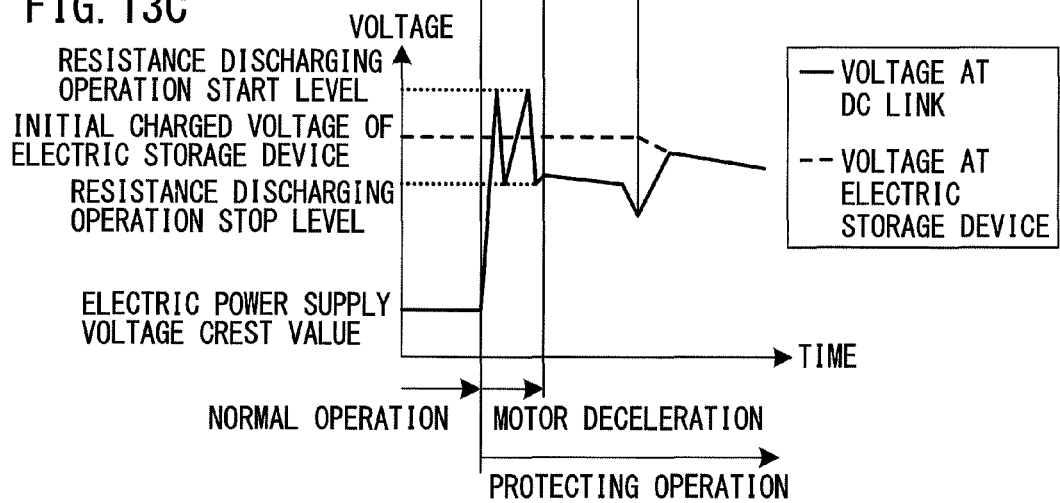
FIG. 13C illustrates voltage fluctuation of the DC link and the electric storage device in the motor control device according to the fourth embodied example when power failure occurs under motor rotation, and the electric storage device supplies DC power to the DC link, and illustrates voltages at the DC link and the electric storage device.

FIG. 13A to FIG. 13C illustrate voltage fluctuation of the DC link and the electric storage device in the motor control device according to the fourth embodied example when power failure occurs under motor rotation, and the electric storage device supplies DC power to the DC link. FIG. 13A illustrates a motor speed, FIG. 13B illustrates a motor driving command or motor output information, and FIG. 13C illustrates voltages at the DC link and the electric storage device. In FIG. 13B, a motor driving command and motor output information is positive in the case of the motor power running state in which the motor 2 consumes electric power, a motor driving command and motor output information is negative in the case of the motor regenerating state in which the motor 2 regenerates electric power, and a motor driving command and motor output information is zero in the no-load state.

When power failure occurs under motor rotation, the protecting operation such as evacuation of a machining target or a tool is started, and the motor 2 is decelerated. When the motor is not being accelerated immediately after power failure occurrence, supply of DC power from the electric storage device 17 to the DC link 13 is not started. When the is being motor decelerated immediately after power failure occurrence, a motor driving command or motor output information indicates the motor regenerating state, and accordingly, the motor driving command or the motor output information is equal to or lower than the third threshold so that supply of DC power from the electric storage device 17 to the DC link 13 is not started. The motor 2 performs the power failure protecting operation such as evacuation of a machining target or a tool, and when a motor driving command or motor output information at this time becomes equal to or higher than the third threshold, supply of DC power from the electric storage device 17 to the DC link 13 is started. Thus, even when a voltage at the DC link rises by stopping motor deceleration immediately after start of the protecting operation, and the resistance discharge device 19 performs the resistance discharging operation, DC power supply from the electric storage device 17 to the DC link 13 is not started by this time. For this reason, DC power stored in the electric storage device 17 is not consumed by resistance discharge of the resistance discharge device 19. Therefore, it is possible to efficiently use energy stored in the electric storage device 17 as energy for the protecting operation at the time of power failure, there is no longer a possibility that energy used for the protecting operation runs short, and the desired protecting operation can be performed reliably.

Next, a motor control device according to a fifth embodied example will be described. According to the fifth embodied example, when the motor 2 is in the regenerating operation state in addition to the case of the above-described fourth embodied example, supply of DC power from the electric power from the electric storage device 17 to the DC link 13 is stopped when a motor driving command or motor output information is equal to or lower than a fourth threshold.

Figure 14:
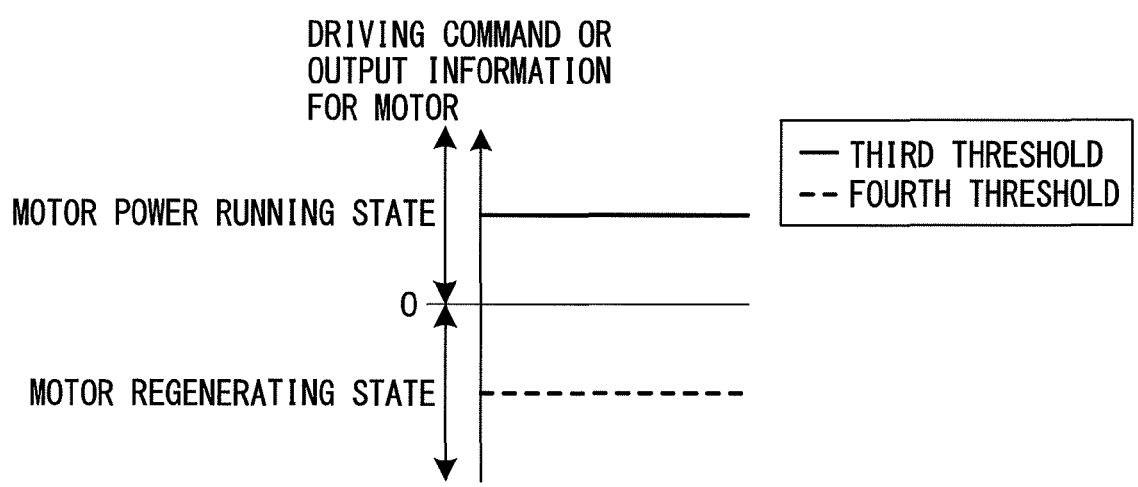
FIG. 14 illustrates the third threshold and a fourth threshold set in the motor control device according to a fifth embodied example.

FIG. 14 illustrates the third threshold and the fourth threshold set in a motor control device according to the fifth embodied example. In FIG. 14, a motor driving command and motor output information is positive in the case of the motor power running state in which the motor 2 consumes electric power, a motor driving command and motor output information is negative in the case of the motor regenerating state in which the motor 2 regenerates electric power, and a motor driving command and motor output information is zero in the no-load state.

According to the fifth embodied example, as illustrated in FIG. 14, in order not to make the electric storage device 17 to supply DC power to the DC link 13 from the time immediately after power failure detection by the power failure detecting unit 14, the third threshold is set when a motor driving command or motor output information indicates the motor power running state, in the same manner as in the case of the above-described fourth embodied example. The third threshold is set in accordance with magnitude of acceleration indicated by a motor driving command, or magnitude of output of the motor indicated by motor output information. Further, when a motor driving command or motor output information indicates the motor regenerating state, the fourth threshold is set. The fourth threshold is set in accordance with magnitude of maximum deceleration indicated by a motor driving command, or magnitude of maximum regeneration output of the motor indicated by motor output information. The fourth threshold is set corresponding to a motor driving command or motor output information that indicates the motor regenerating state. Naturally, the fourth threshold is smaller than the third threshold.

Figure 15A:
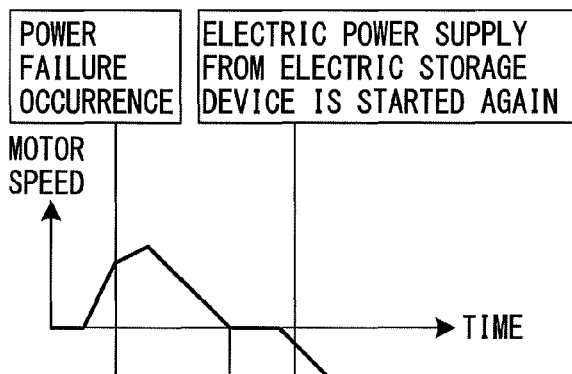
FIG. 15A illustrates voltage fluctuation of the DC link and the electric storage device in the motor control device according to the fifth embodied example when power failure occurs under motor acceleration, and DC power is supplied from the electric storage device to the DC link, and illustrates a motor speed.
Figure 15B:
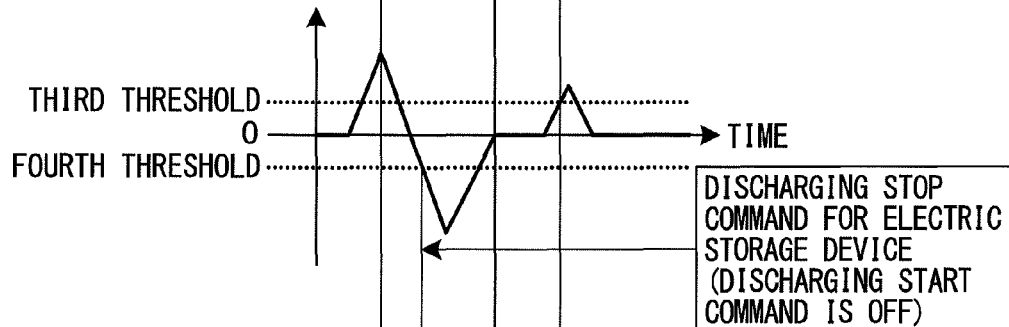
FIG. 15B illustrates voltage fluctuation of the DC link and the electric storage device in the motor control device according to the fifth embodied example when power failure occurs under motor acceleration, and DC power is supplied from the electric storage device to the DC link, and illustrates a motor driving command and motor output information.
Figure 15C:
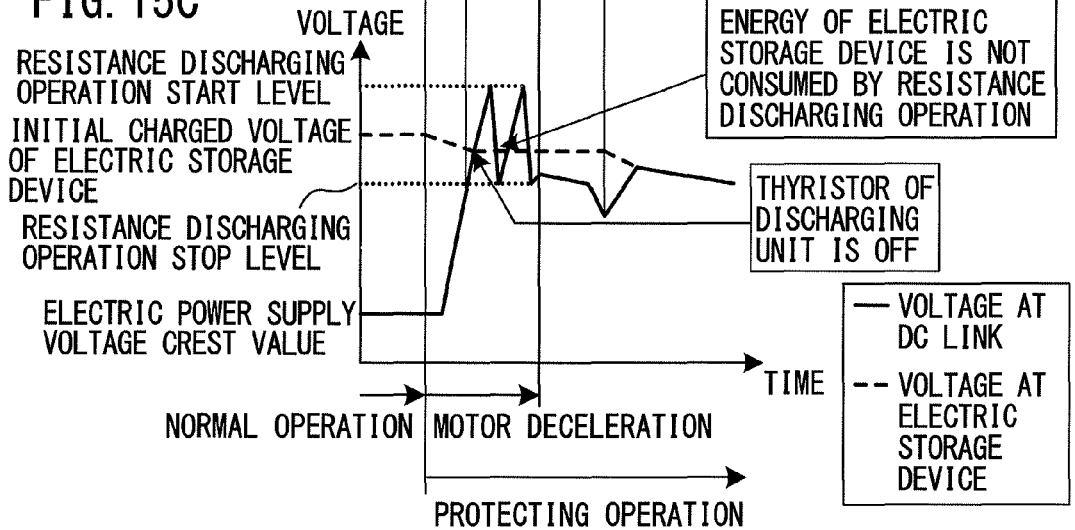
FIG. 15C illustrates voltage fluctuation of the DC link and the electric storage device in the motor control device according to the fifth embodied example when power failure occurs under motor acceleration, and DC power is supplied from the electric storage device to the DC link, and illustrates voltages at the DC link and the electric storage device.
Figure 16:
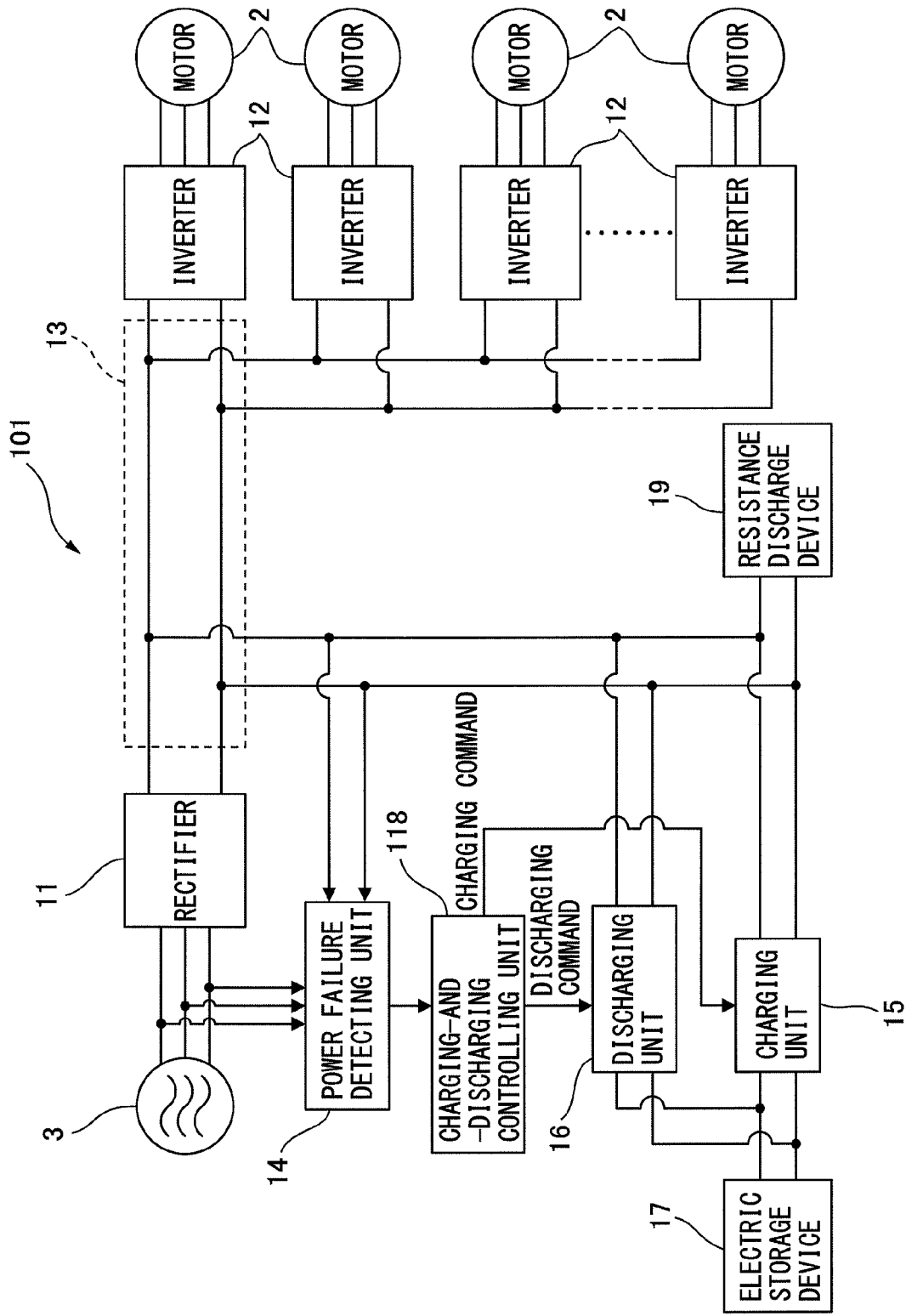
FIG. 16 illustrates a configuration of a general motor control device that drives a plurality of motors.

FIG. 15A to FIG. 15C illustrate voltage fluctuation of the DC link and the electric storage device in the motor control device according to the fifth embodied example when power failure occurs under motor acceleration, and DC power is supplied from the electric storage device to the DC link. FIG. 15A illustrates a motor speed, FIG. 15B illustrates a motor driving command and motor output information, and FIG. 15C illustrates voltages at the DC link and the electric storage device. In FIG. 15B, a motor driving command and motor output information is positive in the case of the motor power running state in which the motor 2 consumes electric power, a motor driving command and motor output information is negative in the case of the motor regenerating state in which the motor 2 regenerates electric power, and a motor driving command and motor output information is zero in the no-load state.

After power failure occurs under motor rotation, the protecting operation such as evacuation of a machining target or a tool is started, and the motor 2 is decelerated. However, after power failure occurrence, when the motor 2 is accelerating, and a motor driving command or motor output information at this time indicates a value equal to or higher than the third threshold, supply of DC power from the electric storage device 17 to the DC link 13 is started. The motor 2 performs the power failure protecting operation such as evacuation of a machining target of a tool so that the motor 2 is decelerated. When a motor driving command or motor output information indicates a value equal to or lower than the fourth threshold, supply of DC power from the electric storage device 17 to the DC link 13 is stopped. However, when the switch (FIG. 18) of the discharging unit 16 is configured by a device that is difficult to be instantly turned off like a thyristor, even when the discharging unit 16 receives a discharging stop command, it is not possible for the discharging unit 16 to instantly make disconnection between the electric storage device 17 and the DC link 13. As a result, the electric storage device 17 stays connected to the DC link 13. Then, a charged voltage of the electric storage device 17 and a DC voltage at the DC link 13 become equal to each other. Further, only a DC voltage at the DC link 13 rises and then an electric current stops flowing through the thyristor. Thereby, the device is turned off. At this timing, the electric storage device 17 is finally disconnected from the DC link 13. Still further, when the motor 2 continues to be decelerated, regenerative electric power of the motor 2 is returned to the DC link 13, and a DC voltage at the DC link 13 continues to rise. When a DC voltage at the DC link 13 reaches the resistance discharging operation start level set in advance, the resistance discharge device 19 starts the resistance discharging operation, and DC power of the DC link 13 is consumed as heat energy. However, at this timing, the electric storage device 17 is disconnected from the DC link 13. Accordingly, although DC power at the DC link 13 is consumed, DC power stored in the electric storage device 17 is not consumed. At the timing that a motor driving command or motor output information becomes equal to or higher than the third threshold in the protecting operation by the motor 2, the discharging operation determining unit 28 commands the discharging unit 16 with a discharging start command for operating the discharging unit 16 again. The discharging unit 16 receives the discharging start command from the discharging operation determining unit 28, and makes short-circuiting between the electric storage device 17 and the DC link 13. Thereby, the discharging operation of the electric storage device 17 is started again so that DC power stored in the electric storage device 17 is supplied to the DC link 13. Thus, DC power that is supplied from the electric storage device 17 to the DC link 13 is inverted into AC power by the inverter 12. By using this AC power as a driving source, the protecting operation such as evacuation of a machining target or a tool is performed.

The present invention can be applied to the case in which the motor control device drives motors in a machine tool, a forging-heading machine, an injection molding machine, an industrial machine, or each of various robots, and includes the rectifier that converts input AC power into DC power, and inverters that invert the DC power output from the DC converting unit into AC power that is supplied as drive power of the respective motors, and when power failure occurs at the AC power supply side of the rectifier, various protecting operation is performed for protecting the motors driven by the motor control device, a tool connected to the motor, a machining target machined by the tool, a manufacturing line including the motor control device, and the like.

According to the present invention, DC power stored in the electric storage device is not consumed by resistance discharge of the resistance discharge device immediately after power failure occurrence. Therefore, it is possible to efficiently use energy stored in the electric storage device as energy for the protecting operation at the time of power failure, there is no longer a possibility that energy used for the protecting operation runs short, and the desired protecting operation can be performed reliably.

What is claimed is:

1. A motor control device comprising:
   a rectifier that rectifies AC power supplied from an AC side to output DC power;
   an inverter that is connected to a DC link at a DC side of the rectifier, and performs interconversion of electric power between DC power at the DC link and drive power for a motor or regenerative electric power, which are AC power;

a voltage detecting unit that detects a DC voltage value at the DC link; a power failure detecting unit that detects power failure at the AC side of the rectifier and detects the DC voltage value;

a discharging operation determining unit that does not output a discharging start command for operating the discharging unit during a period from the time after the power failure detecting unit detects power failure to the time that a DC voltage value detected by the voltage detecting unit becomes equal to or lower than a first threshold, and that outputs the discharging start command for operating the discharging unit when a DC voltage value detected by the voltage detecting unit becomes equal to or lower than the first threshold in response to the power failure detecting unit, wherein the first threshold is set to be equal to or lower than a crest value of an input voltage at the AC side of the rectifier;

an electric storage device that is connected to the DC link, and stores DC power;

a charging unit that has a boosting function of charging the electric storage device at a voltage higher than a DC voltage at the DC link;

a discharging unit that makes short-circuiting between the electric storage device and the DC link to discharge DC power stored in the electric storage device to the DC link; and a resistance discharge device that is connected to the DC link wherein after the power failure detecting unit detects power failure, the resistance discharge device starts resistance discharging operation of consuming DC power of the DC link by resistance discharging when a DC voltage value detected by the voltage detecting unit is equal to or higher than a resistance discharging start level, and the resistance discharge device stops the resistance discharging operation when the DC voltage value detected by the voltage detecting unit is equal to or lower than a resistance discharging stop level lower than the resistance discharging start level.

2. A motor control device comprising:

a rectifier that rectifies AC power supplied from an AC side to output DC power;

an inverter that is connected to a DC link at a DC side of the rectifier, and performs interconversion of electric power between DC power at the DC link and drive power for a motor or regenerative electric power, which are AC power;

a voltage detecting unit that detects a DC voltage value at the DC link;

a power failure detecting unit that detects power failure at the AC side of the rectifier and detects the DC voltage value;

a discharging operation determining unit that does not output a discharging start command for operating the discharging unit during a period from the time after the power failure detecting unit detects power failure to the time that a DC voltage value detected by the voltage detecting unit becomes equal to or lower than a first threshold, and that outputs the discharging start command for operating the discharging unit when a DC voltage value detected by the voltage detecting unit becomes equal to or lower than the first threshold, wherein after the power failure detecting unit detects power failure, the discharging operation determining unit outputs a discharging stop command for stopping operation of the discharging unit when a DC voltage value detected by the voltage detecting unit is higher than the second threshold, which is a value equal to or higher than a first threshold and also equal to or lower than the resistance discharging operation stop level;

an electric storage device that is connected to the DC link, and stores DC power;

a charging unit that has a boosting function of charging the electric storage device at a voltage higher than a DC voltage at the DC link;

a discharging unit that makes short-circuiting between the electric storage device and the DC link to discharge DC power stored in the electric storage device to the DC link; and a resistance discharge device that is connected to the DC link wherein after the power failure detecting unit detects power failure, the resistance discharge device starts resistance discharging operation of consuming DC power of the DC link by resistance discharging when a DC voltage value detected by the voltage detecting unit is equal to or higher than a resistance discharging start level, and the resistance discharge device stops the resistance discharging operation when the DC voltage value detected by the voltage detecting unit is equal to or lower than a resistance discharging stop level lower than the resistance discharging start level.

3. A motor control device comprising:

a rectifier that rectifies AC power supplied from an AC side to output DC power;

an inverter that is connected to a DC link at a DC side of the rectifier, and performs interconversion of electric power between DC power at the DC link and drive power for a motor or regenerative electric power, which are AC power; a voltage detecting unit that detects a DC voltage value at the DC link;

a power failure detecting unit that detects power failure at the AC side of the rectifier;

a discharging operation determining unit that does not output a discharging start command for operating the discharging unit during a period from the time after the power failure detecting unit detects power failure to the time that a DC voltage value detected by the voltage detecting unit becomes equal to or lower than a first threshold, and that outputs the discharging start command for operating the discharging unit when a DC voltage value detected by the voltage detecting unit becomes equal to or lower than the first threshold;

a threshold setting unit that sets the first threshold in accordance with a motor driving command commanding operation of the motor, or motor output information that is information on the output of the motor operating based on the motor driving command, wherein the threshold setting unit sets the first threshold to be equal to or lower than a crest value of an input voltage on the AC side of the rectifier, when the motor driving command or the motor output information indicates a regenerating state in which the motor regenerates electric power, and the threshold setting unit sets the first threshold in accordance with magnitude of acceleration indicated by the motor driving command or magnitude of output of the motor indicated by the motor output information and also to be a value lower than the resistance discharging stop level, when the motor driving command or the motor output information indicates a power running state in which the motor consumes electric power;

an electric storage device that is connected to the DC link, and stores DC power;

a charging unit that has a boosting function of charging the electric storage device at a voltage higher than a DC voltage at the DC link;

a discharging unit that makes short-circuiting between the electric storage device and the DC link to discharge DC power stored in the electric storage device to the DC link; and a resistance discharge device that is connected to the DC link wherein after the power failure detecting unit detects power failure, the resistance discharge device starts resistance discharging operation of consuming DC power of the DC link by resistance discharging when a DC voltage value detected by the voltage detecting unit is equal to or higher than a resistance discharging start level, and the resistance discharge device stops the resistance discharging operation when the DC voltage value detected by the voltage detecting unit is equal to or lower than a resistance discharging stop level lower than the resistance discharging start level.

4. A motor control device comprising:

a rectifier that rectifies AC power supplied from an AC side to output DC power;

an inverter that is connected to a DC link at a DC side of the rectifier, and performs interconversion of electric power between DC power at the DC link and drive power for a motor or regenerative electric power, which are AC power;

a voltage detecting unit that detects a DC voltage value at the DC link;

a power failure detecting unit that detects power failure at the AC side of the rectifier;

a discharging operation determining unit that does not output a discharging start command during a period from the time after the power failure detecting unit detects power failure to the time that a motor driving command commanding power running operation of the motor or motor output information that is information on the output of the motor performing power running operation based on the motor driving command, becomes equal to or higher than a third threshold, and that outputs the discharging start command for operation of the discharging unit when the motor driving command or the motor output information becomes equal to or higher than the third threshold;

an electric storage device that is connected to the DC link, and stores DC power;

a charging unit that has a boosting function of charging the electric storage device at a voltage higher than a DC voltage at the DC link;

a discharging unit that makes short-circuiting between the electric storage device and the DC link to discharge DC power stored in the electric storage device to the DC link; and a resistance discharge device that is connected to the DC link wherein after the power failure detecting unit detects power failure, the resistance discharge device starts resistance discharging operation of consuming DC power of the DC link by resistance discharging when a DC voltage value detected by the voltage detecting unit is equal to or higher than a resistance discharging start level, and the resistance discharge device stops the resistance discharging operation when a DC voltage value detected by the voltage detecting unit is equal to or lower than a resistance discharging stop level lower than the resistance discharging start level.

5. The motor control device according to claim 4, wherein after the power failure detecting unit detects power failure, the discharging operation determining unit outputs a discharging stop command for stopping operation of the discharging unit when a motor driving command commanding regenerating operation of the motor or motor output information that is information on the output of the motor performing regenerating operation based on the motor driving command, is equal to or lower than a fourth threshold lower than the third threshold.

\* \* \* \* \*